United States Patent [19]
Yoneyama et al.

[11] Patent Number: 5,581,314
[45] Date of Patent: Dec. 3, 1996

[54] CAMERA WITH STEREOSCOPIC OPTICAL SYSTEM

[75] Inventors: Shuji Yoneyama; Isamu Hirai; Kiyoshi Kawano; Shinya Suzuka, all of Tokyo, Japan

[73] Assignee: Asahi Kogaku Kogyo Kabushiki Kaisha, Tokyo, Japan

[21] Appl. No.: 360,593

[22] Filed: Dec. 21, 1994

[30] Foreign Application Priority Data

Dec. 21, 1993 [JP] Japan ..................... 5-322878

[51] Int. Cl.⁶ .................................. G03B 35/08
[52] U.S. Cl. .......................... 396/331; 396/323
[58] Field of Search ..................... 354/111, 112, 354/117, 222

[56] References Cited

U.S. PATENT DOCUMENTS 3,815,970  6/1974  Murphy .................................. 354/117
5,349,403  9/1994  Lo ......................................... 354/114

FOREIGN PATENT DOCUMENTS 2-301740  12/1990  Japan .
2231675  11/1990  United Kingdom .

*Primary Examiner*—Howard B. Blankenship
*Attorney, Agent, or Firm*—Greenblum & Bernstein P.L.C.

[57] ABSTRACT

A stereoscopic camera is provided with a mechanism to move reflective members into and out of an optical path such that the camera may take stereoscopic photographs in one position of the moving mechanism. The camera may also take normal full-frame photographs in a second position of the moving mechanism.

26 Claims, 18 Drawing Sheets

5,581,314

CAMERA WITH STEREOSCOPIC OPTICAL SYSTEM

BACKGROUND OF THE INVENTION

The present invention relates to stereoscopic photography, specifically to a camera having a stereoscopic optical system enabling stereoscopic photography.

FIG. 1 shows the basic principle of stereoscopic photography using a single lens and mirrors to provide the necessary parallax, which gives dual-image stereoscopic photographs that may be viewed with a typical stereoscopic viewer or by "training" one's eyes. With experience, one can accustom or "train" one's eyes to viewing stereoscopic photographs without the aid of a viewer. Light reflected from or emitted by an object 5 is reflected by a left mirror 4a and a right mirror 4b, and again reflected by secondary mirrors 3a and 3b respectively. The light, reflected by the secondary mirrors 3a and 3b, is focused as it passes through the lens 1, and the left and right images are switched by the lens 1. The light then impinges on the film plane 6 to form images 5a and 5b respectively. When film exposed at the film plane 6 is developed, the images 5a and 5b can be viewed through a conventional stereoscopic viewer to produce a three-dimensional image. The switching of the left and right images in the lens 1 produces respective images in a stereoscopic photograph that are in the correct orientation and position to be viewed by the left and right eyes to produce a three-dimensional image (if one's eyes are "trained" or with the use of a standard viewer).

Stereoscopic adapters for conventional cameras are well known, wherein a set of mirrors or prisms are arranged in an adapter attached to the end of a conventional lens to provide a stereoscopic image. However, stereoscopic adapters are typically bulky and inconvenient, and both the camera and the adapter device must be carried by a photographer. Furthermore, conventional stereoscopic cameras are not able to take ordinary full-frame photographs. Japanese Patent Provisional Publication HEI 2-301740 discloses a camera capable of taking both ordinary photographs and special stereoscopic photographs, but the disclosed camera does not switch the left and right incoming images, and a complicated non-standard stereoscopic viewer is required to view the resulting reversed stereoscopic images; furthermore, the reversed stereoscopic photographs cannot be viewed stereoscopically by the "trained" naked eye.

SUMMARY OF THE INVENTION

It is therefore an object of the present invention to provide an improved stereoscopic camera which is able to take both ordinary full-frame photographs and conventional split-frame stereoscopic photographs.

It is a further object of the present invention to provide an improved stereoscopic camera which is compact and easily transported.

According to one aspect of the present invention a camera has a stereoscopic photographing system, and the system comprises: a photographing lens; a first pair of reflection members; a second pair of reflection members; and a retraction mechanism, associated with at least the second pair of reflection members. The retraction mechanism has a retracted position where at least the second pair of reflecting members are retracted away from each other such that light from the object to be photographed is directly incident on the photographing lens; when the retraction mechanism is in an unretracted position, the first pair of reflecting members reflects the light from an object to be photographed to be incident on the second pair of reflecting members, and the second pair of reflecting members reflects light incident on the second pair of reflecting members towards the photographing lens to be incident on the photographing lens. Preferably, the system further comprises a film plane bearing a film, the film plane arranged behind the lens, a full-frame image is formed on the film when the retraction mechanism is in the retracted position, and a stereoscopic image comprising side by side correspondent images is formed on the film when the retraction mechanism is in the unretracted position.

According to another aspect of the present invention, the system further comprises: an image opening, the image opening defining a maximum size of an image to be formed on the film, the image opening formed between the lens and the film; and means for selectively blocking at least part of the image opening, the blocking means arranged between the lens and the film, such that a size of the image formed on the film is defined by the image opening and the blocking means. Preferably, the system still further comprises: a finder, wherein a finder image in the finder corresponds to the maximum size of an image to be formed on the film; a means for altering a finder image visible in the finder, wherein the means for altering alters the finder image such that the finder image corresponds to the image to be formed on the film. In this case, the altering means comprises at least one masking portion to block a corresponding part of the finder image to a blocked portion of the image to be formed on the film.

According to still another aspect of the present invention, a camera has a stereoscopic photographing system, and the system comprises: a camera housing; a photographing lens; a first pair of reflection members; a second pair of reflection members, wherein the first pair of reflecting members reflects the light from an object to be photographed to be incident on the second pair of reflecting members, and the second pair of reflecting members reflects light incident on the second pair of reflecting members towards the photographing lens to be incident on the photographing lens; and a pair of transparent sliding windows, provided to the housing and slidable relative to the housing, each window of the pair of sliding windows slidable in a direction away from an optical axis of the photographing lens and perpendicular to the optical axis of the photographing lens. In this case, each of the second pair of reflective members is associated with a respective window of the pair of sliding windows, such that each reflective member of the second pair of reflecting members is movable away from the optical axis of the photographing lens.

According to yet another aspect of the present invention, a camera has a stereoscopic photographing system, and the system comprises: a photographing lens; a first pair of reflection members; a second pair of reflection members, wherein the first pair of reflecting members reflects the light from an object to be photographed to be incident on the second pair of reflecting members, and the second pair of reflecting members reflects light incident on the second pair of reflecting members towards the photographing lens to be incident on the photographing lens; a collapsible housing, having an inner and an outer portion, the inner portion slidable relative to the outer portion, the inner portion being pushed into the outer portion when the collapsible housing is collapsed, and the inner portion being pulled to protrude from the outer portion when the collapsible housing is expanded; and a first retraction mechanism, associated with the collapsible housing, for retracting the second pair of reflecting members, the first retraction mechanism having a retracted position and an unretracted position, and the second pair of reflection members reflecting light incident on the second pair of reflecting members towards the photographing lens to be incident on the photographing lens when the first retraction mechanism is in the unretracted position. In this case, the first retraction mechanism is moved to the retracted position when the collapsible housing is collapsed, and is returned to the unretracted position when the collapsible housing is expanded.

Preferably, the first retraction mechanism comprises a swinging mechanism for swinging each reflective member of the second pair of reflecting members towards the inner portion of the collapsible housing when the collapsible housing is collapsed, and the swinging mechanism comprises: at least one axis, provided to one edge of each member of the second pair of reflecting members, each member of the second pair of reflecting members swingable about the at least one axis; a pair of contact members, each contact member of the pair of contact members provided to a remaining edge of each member of the second pair of reflecting members; and at least one biasing member, provided to the second pair of reflecting members, for biasing the second pair of reflective members to swing towards the outer housing. In this case, contact between the contact members and the outer housing swings each reflective member of the second pair of reflecting members, against the bias of the at least one biasing member, towards the inner portion of the collapsible housing when the collapsible housing is collapsed, and the second pair of reflecting members are biased by the at least one biasing member such that the contact members remain in contact with the outer housing when the collapsible housing is expanded.

According to still yet another aspect of the present invention, a camera has a stereoscopic photographing system, and the system comprises: a collapsible housing, having an inner and an outer portion, the inner portion slidable relative to the outer portion, the inner portion being pushed into the outer portion when the collapsible housing is collapsed, and the inner portion being pulled to protrude from the outer portion when the collapsible housing is expanded; a photographing lens; a first pair of reflection members; a second pair of reflection members, wherein the first pair of reflecting members reflects the light from an object to be photographed to be incident on the second pair of reflecting members, and the second pair of reflecting members reflects light incident on the second pair of reflecting members towards the photographing lens to be incident on the photographing lens; at least one first axis, provided to one edge of each member of the second pair of reflecting members, each member of the second pair of reflecting members swingable about the at least one first axis; a pair of first contact members, each contact member of the pair of first contact members provided to a remaining edge of each member of the second pair of reflecting members; at least one first biasing member, provided to the second pair of reflecting members, for biasing the second pair of reflective members to swing towards the outer housing; at least one second axis, provided to one edge of each member of the first pair of reflecting members, each member of the first pair of reflecting members swingable about the at least one second axis; a pair of second contact members, each contact member of the pair of second contact members provided to a remaining edge of each member of the first pair of reflecting members; and at least one second biasing member, provided to the first pair of reflecting members, for biasing the first pair of reflective members to swing towards the outer housing. In this case, contact between the first contact members and the outer housing swings each reflective member of the second pair of reflecting members, against the bias of the at least one first biasing member, towards the inner portion of the collapsible housing, and contact between the second contact members and the outer housing swings each reflective member of the first pair of reflecting members, against the bias of the at least one second biasing member, towards the inner portion of the collapsible housing, when the collapsible housing is collapsed, and the second pair of reflecting members are biased by the at least one first biasing member such that the first contact members remain in contact with the outer housing and the first pair of reflecting members are biased by the at least one second biasing member such that the second contact members remain in contact with the outer housing, when the collapsible housing is expanded.

According to a further aspect of the present invention, a camera has a stereoscopic photographing system, and the system comprises: a photographing lens; a first pair of reflection members; a second pair of reflection members, wherein the first pair of reflecting members reflects the light from an object to be photographed to be incident on the second pair of reflecting members, and the second pair of reflecting members reflects light incident on the second pair of reflecting members towards the photographing lens to be incident on the photographing lens; a collapsible housing, having an inner and an outer portion, the inner portion slidable relative to the outer portion, the inner portion being pushed into the outer portion when the collapsible housing is collapsed; a sliding mechanism, provided to the second pair of reflecting members and associated with the collapsible housing, for sliding each reflective member of the second pair of reflecting members away from an optical axis of the photographing lens when the collapsible housing is collapsed; and a swinging mechanism, provided to the first pair of reflecting members and associated with the collapsible housing, for swinging each reflective member of the first pair of reflecting members towards the inner portion of the collapsible housing when the collapsible housing is collapsed.

According to a still further aspect of the present invention, a camera has a stereoscopic photographing system, and the system comprises: a photographing lens; a first pair of reflection members; a second pair of reflection members, wherein the first pair of reflecting members reflects the light from an object to be photographed to be incident on the second pair of reflecting members, and the second pair of reflecting members reflects light incident on the second pair of reflecting members towards the photographing lens to be incident on the photographing lens; and a mechanism for moving at least the second pair of reflecting members to a position relative to the photographing lens and to the first pair of reflective members, such that the light from an object to be photographed, incident on the first pair of reflective members, is reflected to the second pair of reflective members and thence to the photographing lens.

DESCRIPTION OF THE ACCOMPANYING DRAWINGS

DESCRIPTION OF THE EMBODIMENTS

With reference to the drawings, the embodiments of the present invention are described.

Figure 2:
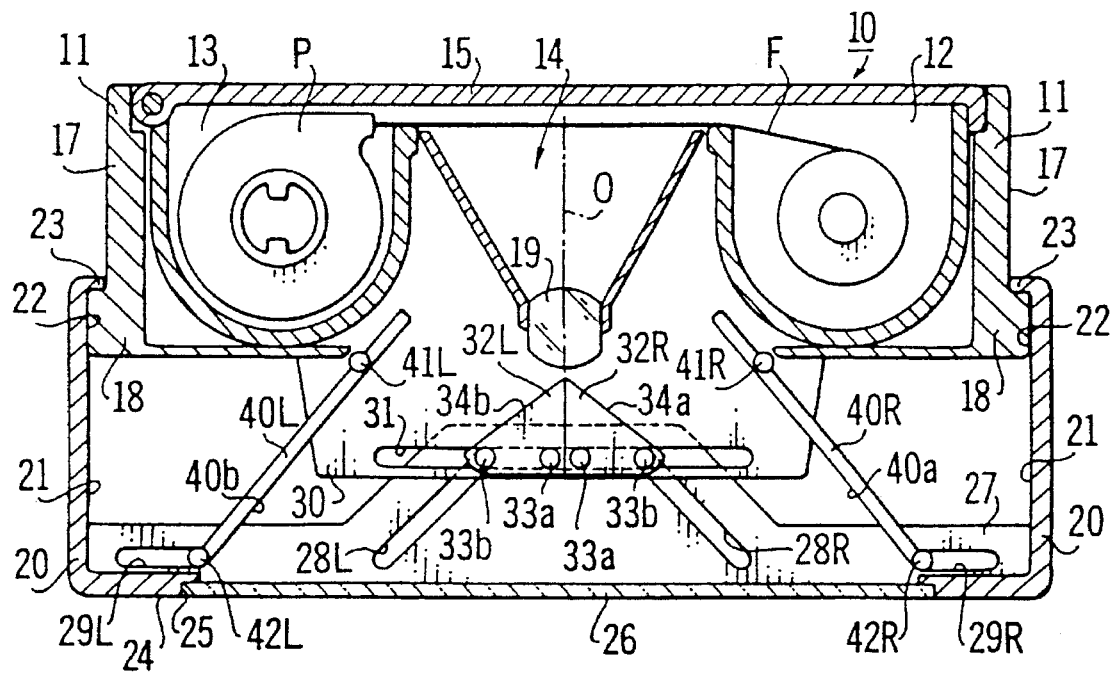
FIG. 2 is a cross-sectional plan view of a first embodiment of a stereoscopic camera, showing a first state.

A first embodiment of an improved stereoscopic camera is shown in FIG. 2. The first embodiment uses a collapsible inner body and associated mirror moving device to allow ordinary full-frame and stereo photography in collapsed and expanded states, respectively, of the inner body.

The camera 10 according to the first embodiment is collapsible, and includes an inner body 11 slidably provided with an outer casing 20. The inner body 11 includes a cartridge chamber 13 for housing a film cartridge P (indicated by a single dashed line in FIG. 2), and a spool chamber 12 for collecting exposed film. An image opening 14 is defined in the inner body 11 between the chambers 12 and 13. When film is properly loaded in the camera 10, film extends from the cartridge P in the cartridge chamber 13, across the image opening 14. A back lid 15 is rotatably supported by the inner body 11, and may be swung open and closed to load and unload film.

A photographing lens 19 is disposed in front of the image opening 14. The photographing lens 19 is supported and positioned using a conventional lens support arrangement. Furthermore, a conventional shutter mechanism (not shown) is provided between the photographing lens 19 and the image opening 14. The photographing lens 19 focuses incoming light, which then passes through the shutter mechanism and the image opening 14 before impinging on the film extending across the image opening 14 as described. A set of parallel upper and lower support plates 30, 30 (shown in FIG. 3) are provided to the inner body 11, extending in the direction of the outer casing 20 as shown in FIG. 2.

Figure 4:
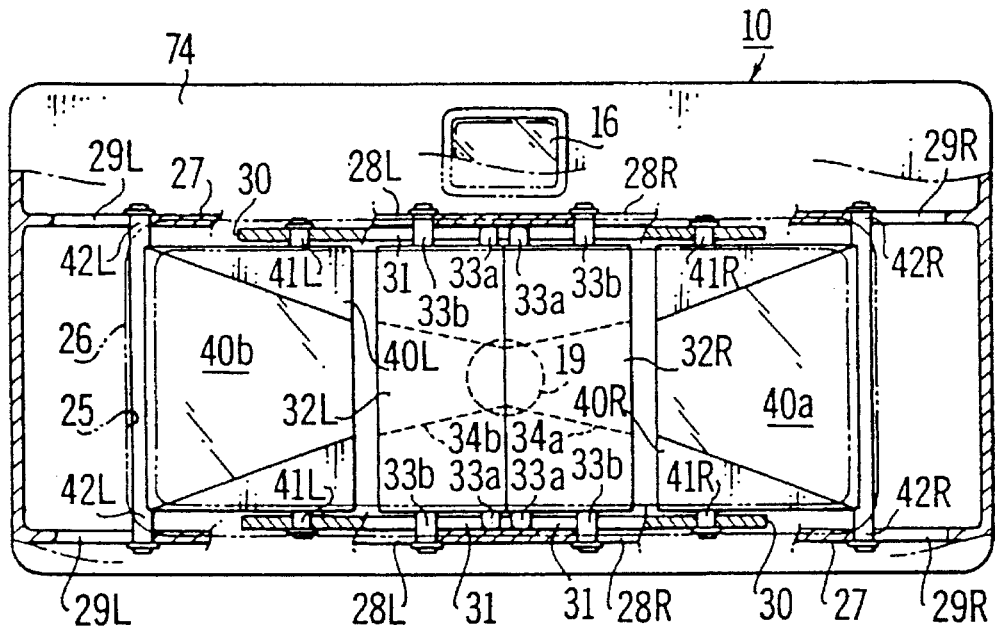
FIG. 4 is a front view of the first embodiment of a stereoscopic camera, showing the first state.

The inner body 11 is arranged to be slidable relative to the outer casing 20 in the direction of the optical axis. In FIG. 2, the camera 10 is shown at a fully extracted position with the inner body 11 extracted from the outer casing 20. FIG. 4 shows a collapsed condition of the camera 10, with the inner body 11 slid into the outer casing 20. The outer casing 20 is shaped as a box with one open side, and is slightly larger than the inner body 11. Inwardly bent portions 23 of the outer casing 20 slidably engage the outer surfaces 17 of the inner body 11. A window opening 25 is formed in a front side 24 of the outer casing 20, opposite the inner body 11. The window opening 25 is covered with a transparent window plate 26. A plate member 27 is provided inside the front side 24 of the outer casing 20, extending towards the inner body 11. The plate member 27 is arranged above and inside the bottom support plate 30.

As shown in FIG. 4, a finder 16 is provided in the upper part of the front of the outer casing 20. An object to be photographed through the window plate 26 is observed through the finder 16 and provided in the inner body 11.

The outer casing 20 is provided with a pair of swingable mirrors 40L, 40R and a pair of slidable mirrors 32L, 32R that move when the camera 10 is collapsed or expanded. The suffixes "L" or "R" as used with reference numbers denote left and right side parts respectively, as viewed from the perspective of FIG. 4. The pairs of mirrors 40L, 40R and 32L, 32R are symmetrical on either side of the optical axis O. Each of the swingable mirrors 40L, 40R has an axis shaft 41L, 41R, respectively, near an inner edge. Each axis shaft 41L, 41R is swingably supported by the parallel upper and lower support plates 30, 30. An outer edge of each swingable mirror 40L, 40R is provided with a guide pin 42L, 42R, and the guide pins 42L, 42R engage guide grooves 29L, 29R provided to the plate member 27. The guide grooves 29L, 29R are each substantially parallel to the front side 24 of the outer casing 20 in this embodiment. Thus, each of the swingable mirrors 40L, 40R is swingably supported near an inner edge and guided at an outer edge.

The slidable mirrors 32L, 32R are provided directly on either side of the optical axis O. The slidable mirrors 32L, 32R are shaped as right angle prisms with the hypotenuse face angled with reference to the image opening 14, one right angle face parallel with the optical axis O, and the remaining right angle face parallel with the front side 24 of the outer casing 20. Each of the slidable mirrors 32L, 32R is provided with an inner pin 33a and an outer pin 33b provided at opposite corners of the right angle face parallel with the casing front side 24. The inner pins 33a, 33a and outer pins 33b, 33b are each guided by a guide groove 31 provided in the lower support plate 30. The guide groove 31 is perpendicular to the optical axis O and symmetrical on either side of the optical axis O. The slidable mirrors 32L, 32R are thereby restricted to be slidable perpendicular to the optical axis O.

The outer guide pins 33b and 33b of the slidable mirrors 32L and 32R, respectively, are further guided by diagonal guide grooves 28L, 28R provided to the plate member 27 of the outer casing 20. The diagonal guide grooves 28L, 28R extend from a position near to the optical axis O on the image opening 14 side, to a position remote from the optical axis O on the casing front side 24. By virtue of the double engagement of the pins 33b, 33b in the guide groove 31 and diagonal guide grooves 28L, 28R, the slidable mirrors 32 are moved away from and perpendicular to the optical axis O when the camera 10 is collapsed, and towards and perpendicular to the optical axis O when the camera 10 is expanded.

Figure 1:
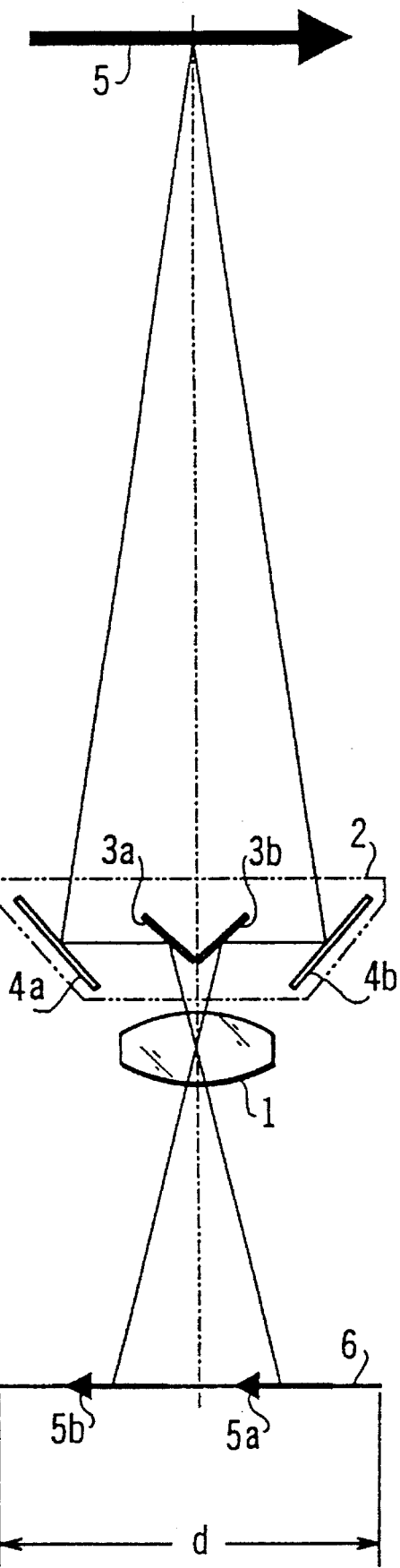
FIG. 1 is a schematic showing a basic principle of stereoscopic photography.

As shown in FIG. 2, when the camera 10 is in an expanded state, a reflective side 40b, 40a of each of the swingable mirrors 40L, 40R, respectively, is at an angle to both of the optical axis O and the window plate 26. In the expanded state of the camera 10, the reflective sides 40b and 40a shown in FIGS. 2 and 4 operate in a manner analogous to the reflective surfaces 4a and 4b, respectively, as shown in FIG. 1. Further, when the camera 10 is in an expanded state, a reflective side 34b, 34a of each of the slidable mirrors 32L, 32R, respectively, faces the reflective side 40b, 40a and is at an angle to the image opening 14. When the camera 10 is in an expanded state, the reflective sides 34b and 34a shown in FIGS. 2 and 4 operate in a manner analogous to the reflective surfaces 3a and 3b, respectively, as shown in FIG. 1.

Figure 3:
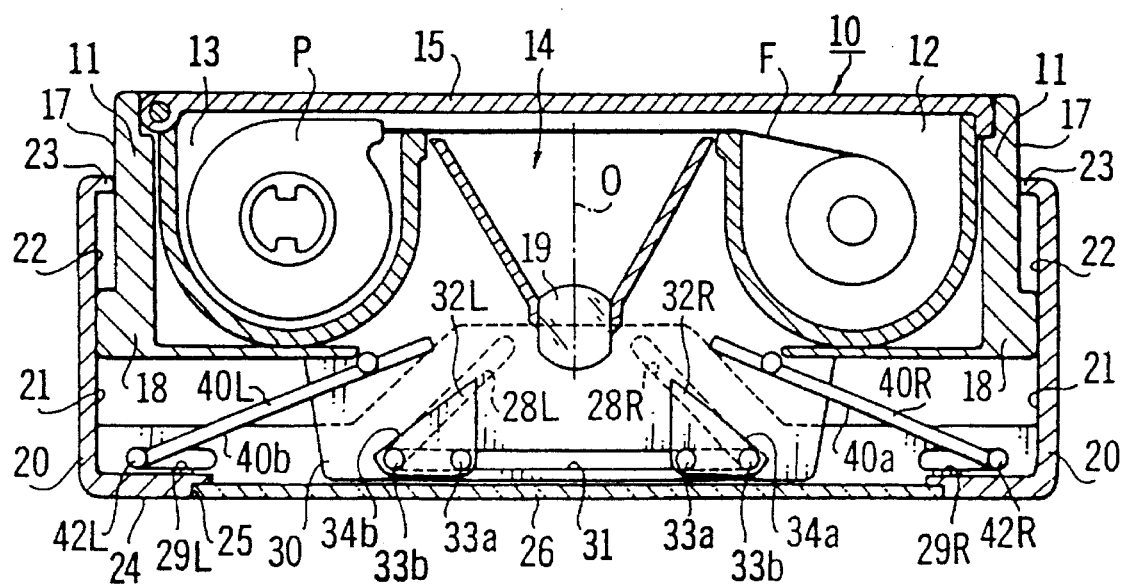
FIG. 3 is a cross-sectional plan view of the first embodiment of a stereoscopic camera, showing a second state.
Figure 5:
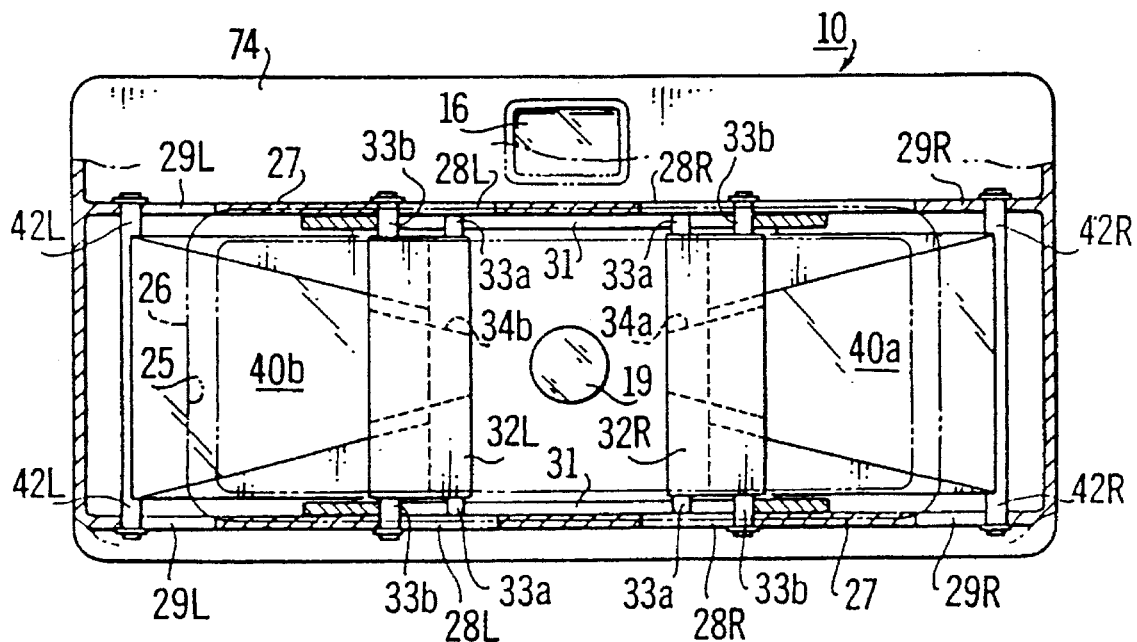
FIG. 5 is a front view of the first embodiment of a stereoscopic camera, showing the second state.

A path by which light travels, through the lens 19 and the image opening 14 to form an image on the film, exists in front of the lens 19. When the camera 10 is collapsed, as shown in FIGS. 3 and 5, the mirrors 40L and 40R are swung to occupy less internal space, and the mirrors 34L and 34R are slid to the left and right sides, away from the optical axis O. Thus, the mirrors 40L, 40R, 34L, and 34R are removed from the aforementioned light path, and normal full-frame photographs may be taken.

With the camera 10 expanded (FIG. 2), in order to take a stereoscopic photograph, the light from the object to be photographed enters the camera 10 through the window plate 26, is reflected by surfaces 40b, 40a and then 34b, 34a, respectively. The left and right images cross over as they are focused by the lens 19, and are projected onto the correct side of the film through the image opening 14. The photographer presses a conventional release button (not shown) on the camera 10, and an exposure is taken through the lens 19 by a conventional shutter mechanism (not shown), as the light enters the camera 10 as shown in FIG. 1.

Figure 23:
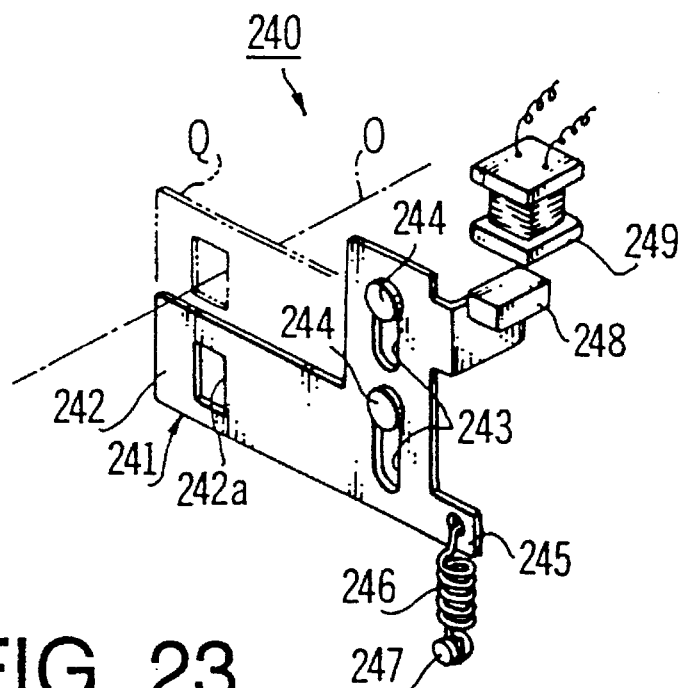
FIG. 23 is a perspective view of a stereoscopic framing mechanism.

In FIG. 23, a mechanism 240 to provide a correct stereoscopic finder image, showing a stereoscopic image proportion and extent, is shown. A stereoscopic photograph as described results in dual 24×18 mm images. A finder image may be blocked to represent a stereoscopic picture, and the framing area visible in the finder is substantially correct.

The stereoscopic finder image framing mechanism 240 of FIG. 23 is placed proximate to the optical path of the finder 16. The framing mechanism 240 comprises a movable frame 241 and an electromagnet 249. The movable frame 241 includes a blocking portion 242, an aperture 242a, vertical guide grooves 243, a tab 245, and a ferromagnetic attraction portion 248. The aperture 242a is shaped with the appropriate proportions for one side image of a stereoscopic image. The movable frame 241 is supported and guided by pins 244 provided to the body 11 (not shown), and the location of the pins 244 defines the vertical movement range of the movable frame 241. The movable frame 241, and therefore the aperture 242a and blocking portion 242, is movable between a normal photographing position, shown by a solid line, and a stereoscopic photographing position Q, shown by a double dashed line. The frame 241 is biased away from the finder optical path by a tension spring 246 connected between the tab 245 and a pin 247 provided to the body 11 (not shown), and is movable between positions by means of the electromagnet 249 and the ferromagnetic portion 248. When the electromagnet 249 is energized, the ferromagnetic portion 248 is attracted, and the aperture 242a and blocking portion 242 are moved into position Q. When the electromagnet 249 is de-energised the frame 241 returns, leaving the finder optical path. The electromagnet 249 of the mechanism 240 is energized when a switch (not shown) provided to the body 11 is closed and turned on, the switch is actuated when the camera 10 is expanded.

When the photographer wishes to take a normal full-frame photograph, the inner body 11 is pushed into the outer casing 20. The guide grooves 29L, 29R guide the guide pins 42L, 42R respectively, and the mirrors 40L, 40R swing about the axes 41L, 41R, respectively, towards the inner body 11. Simultaneously, the diagonal guide grooves 28L, 28R guide the outer pins 33b, 33b to slide the slidable mirrors 32L, 32R, respectively, along the guide slot 31. Each mirror 32L, 32R slides perpendicularly away from the optical axis. An optical path in front of the lens 19 is thereby opened by the motion of the mirrors 40L, 40R, and 32L, 32R, and the camera is ready to take normal full-frame photographs (FIG. 3). The photographer presses a conventional release button (not shown) on the camera 10, and an exposure is taken through the lens 19 by a conventional shutter mechanism (not shown), as light enters the camera 10 directly through the lens 19.

Thus, the first embodiment of a stereoscopic camera 10 is able to take both normal and stereoscopic photographs, and easily switches between the two modes by collapsing and expanding the camera 10. Furthermore, the camera 10 is compact when collapsed, and may be easily and conveniently carried. The first embodiment of a stereoscopic camera 10 allows the taking of stereoscopic and normal photographs without the use of any adapter, and stereoscopic photographs taken with the camera 10 may be viewed with a conventional stereoscopic viewer.

A second embodiment of a stereoscopic camera 60 is shown in FIGS. 6 through 9. The inner body 11' of the second embodiment is structured identically to the inner body 11 of the first embodiment, except that the upper and lower support members 30, 30 of the first embodiment are replaced by upper and lower pivot support members 80, 80 of the second embodiment. The upper and lower pivot members are arranged to rotatably support mirrors 81L, 81R, 97L, and 97R via pivot shafts 41L, 41R and 91a.

The outer casing 20 is provided with a first pair of swingable mirrors 97L, 97R, and a second pair of swingable mirrors 81L, 81R, that move when the camera 60 is collapsed and expanded. The suffixes "L" or "R" as used with reference numbers denote left and right side parts respectively, as viewed from the perspective of FIG. 6. The pairs of mirrors 81L, 81R and 97L, 97R are symmetrical on either side of the optical axis O. Each of the swingable mirrors 81L, 81R has an axis shaft 82L, 82R, respectively, near an inner edge. Each axis shaft 82L, 82R is swingably supported by the parallel upper and lower support plates 80, 80. An outer edge of each swingable mirror 81L, 81R is provided with a contact pin 42L, 42R, respectively, and the contact pins 42L, 42R engage the inner surface of the front wall of an outer casing 70. Thus, each of the second swingable mirrors 81L, 81R is swingably supported near an inner edge and guided at an outer edge.

The first swingable mirrors 97L, 97R are both swingably supported at an inner edge, sharing an axis shaft 91a. The axis shaft 91a is swingably supported by the parallel upper and lower support plates 80, 80. An outer edge of each swingable mirror 97L, 97R is provided with a contact pin 91b, and the contact pins 91b, 91b engage the inner surface of the front wall 74 of an outer casing 70. Thus, each of the first swingable mirrors 81L, 81R is swingably supported by an inner edge and guided at an outer edge.

Figure 6:
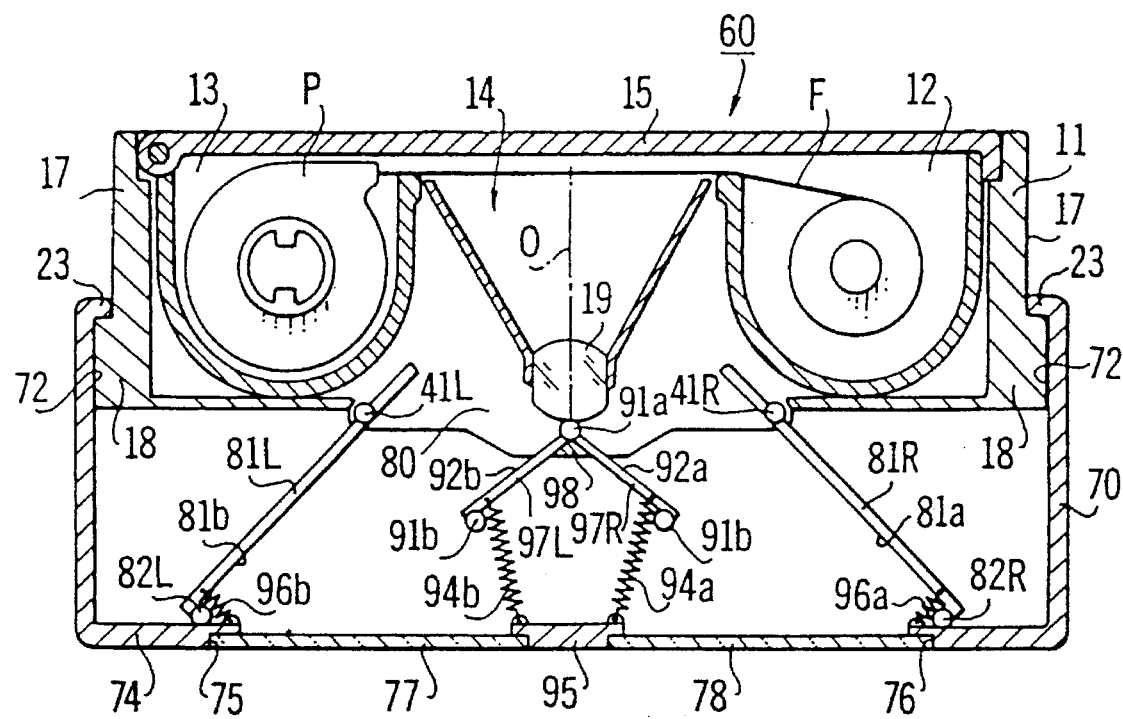
FIG. 6 is a cross-sectional plan view of a second embodiment of a stereoscopic camera, showing a first state.

As shown in FIG. 6, when the camera 60 is in an expanded state, a reflective side 81b, 81a of each of the first swingable mirrors 81L, 81R, respectively, is at an angle both to the optical axis O and to the respective window plates 77, 78. In the expanded state of the camera 60, the reflective sides 81b and 81a shown in FIGS. 6 and 8 operate in a manner analogous to the reflective surfaces 4a and 4b, respectively, as shown in FIG. 1. Further, when the camera 60 is in an expanded state, a reflective side 92b, 92a of each of the second swingable mirrors 97L, 97R, respectively, faces the respective reflective side 81b, 81a of the first swingable mirror 81L, 81R, and is at an angle to the image opening 14. When the camera 60 is in an expanded state, the reflective sides 92b and 92a shown in FIGS. 6 and 8 operate in a manner analogous to the reflective surfaces 3a and 3b, respectively, as shown in FIG. 1.

Figure 7:
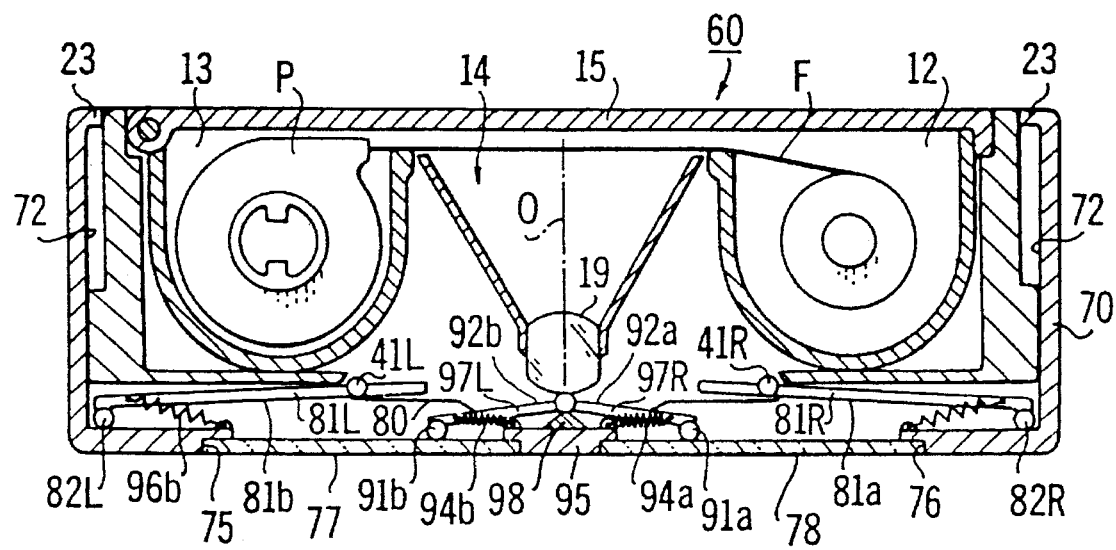
FIG. 7 is a cross-sectional plan view of the second embodiment of a stereoscopic camera, showing a second state.
Figure 8:
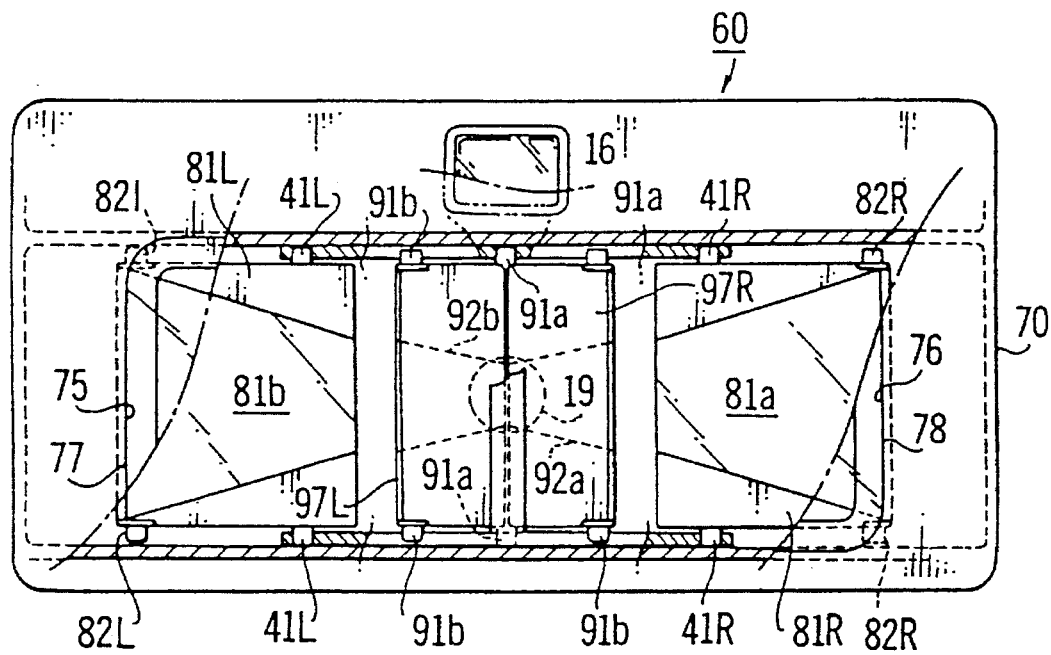
FIG. 8 is a front view of the second embodiment of a stereoscopic camera, showing the first state.
Figure 9:
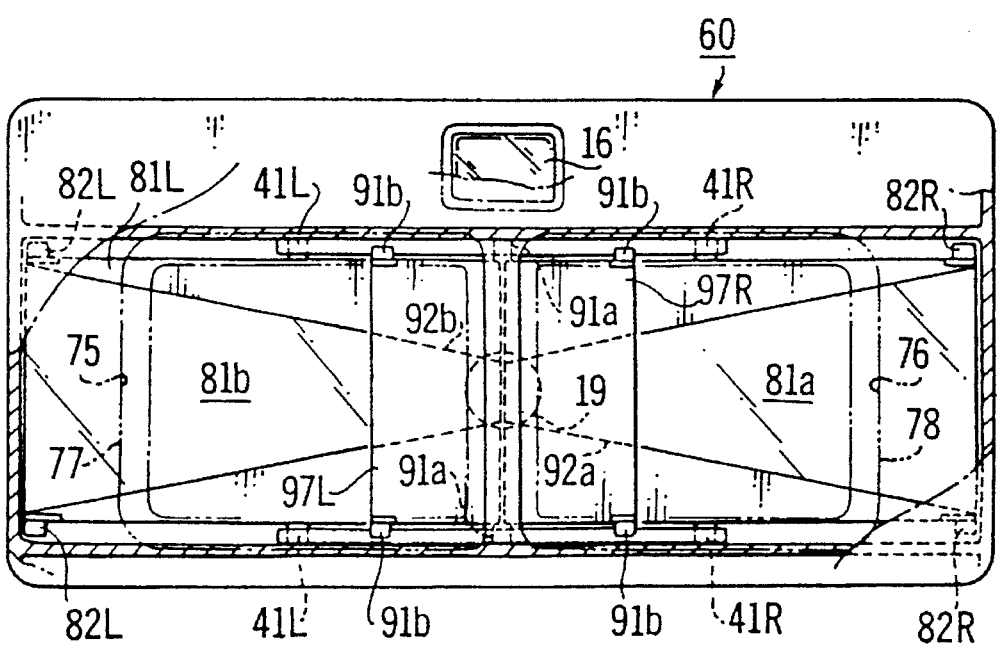
FIG. 9 is a front view of the second embodiment of a stereoscopic camera, showing the second state.

When the camera 60 is fully collapsed, as shown in FIGS. 7 and 9, the mirrors 81L, 81R, 97L, and 97R are swung to occupy less internal space.

With the camera 60 expanded (FIG. 6), in order to take a stereoscopic photograph, the light from the object to be photographed enters the camera 60 through the window plates 77 and 78, and is reflected by surfaces 81b, 81a and then 92b, 92a, respectively. The left and right images cross over as they are focused by the lens 19, and are projected onto the correct side of the film through the image opening 14. The photographer presses a conventional release button (not shown) on the camera 10, and an exposure is taken through the lens 19 by a conventional shutter mechanism (not shown), as the light enters the camera 10 as shown in FIG. 1.

When the photographer wishes to store or carry the camera 60 compactly, the inner body 11' is pushed into the outer casing 70. The inner surface of the front wall 74 of the outer casing 70 guides the contact pins 82L, 82R respectively, and the mirrors 81L, 81R swing about the axes 41L, 41R, respectively, towards the inner body 11. The inner surface of the front wall 74 of the outer casing 70 guides the contact pins 91L, 91R respectively, and the mirrors 97L, 97R swing about the axis 91a, towards the inner body 11. Each mirror 81L, 81R, 97L, and 97R swings to move into the narrow space formed between the inner body 11' and outer casing 70, as shown in FIG. 7. Thus, the camera 60 is collapsed to an extremely compact size, roughly half of the expanded volume.

Thus, the second embodiment of a stereoscopic camera 60 is able to take stereoscopic photographs, viewable with a conventional viewer, and is further able to be collapsed to approximately one half of its operating size. It is therefore easily transported, and a complete stereoscopic camera system may be carried in the same space that a conventional camera could be carried, without the need for an additional adapter.

FIGS. 10 through 13 show a third embodiment of a stereoscopic camera 99. The third embodiment uses sliding members to remove reflective surfaces from an image path, and is able to expose both stereoscopic photographs and ordinary full-frame photographs. Furthermore, the third embodiment is able to combine a panoramic framing feature with the stereoscopic mode, and can thereby further expose a panoramic and stereoscopic photograph.

Figure 10:
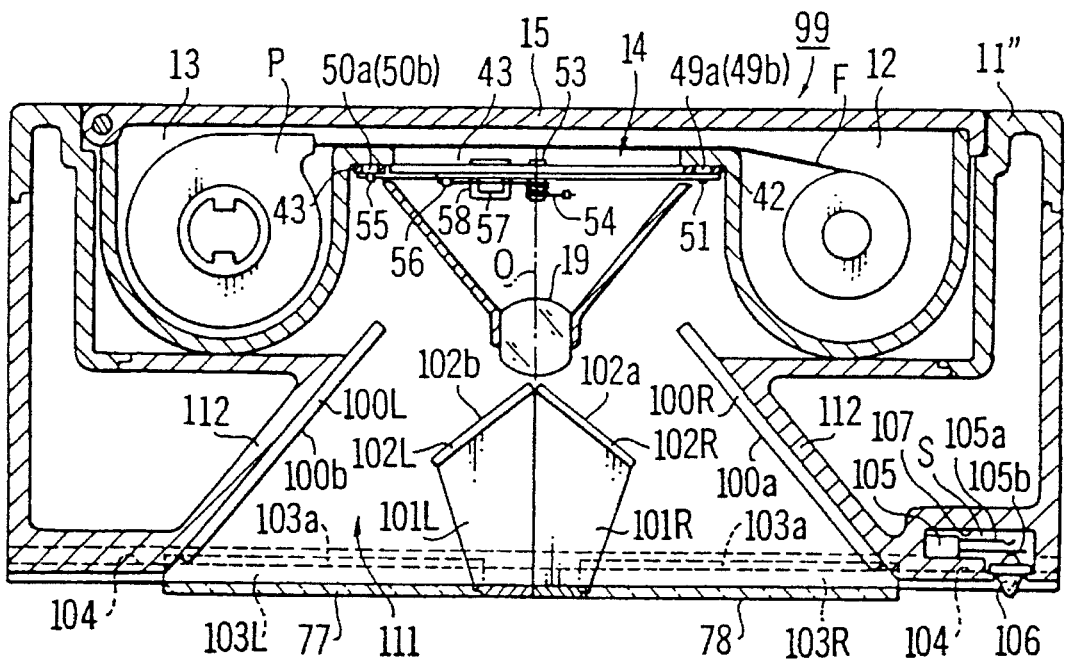
FIG. 10 is a cross-sectional plan view of a third embodiment of a stereoscopic camera, showing a first state.

As shown in FIG. 10, the camera 99 comprises unit body 11". The unit body 11" includes a film handling area with a cartridge chamber 13, spool chamber 12, back lid 15, image opening 14, and lens 19 substantially the same as the first and second embodiments. The third embodiment is not collapsible; rather, it uses sliding windows 77 and 78 at the front of the unit body 11" to move mirrors 102L and 102R, respectively, away from a light path entering the lens.

The photographing lens 19 is disposed in front of the image opening 14. The photographing lens 19 is supported and positioned using a conventional lens support arrangement. Furthermore, a conventional shutter mechanism (not shown) is provided between the photographing lens 19 and the image opening 14. The photographing lens 19 focuses incoming light, which then passes through the shutter mechanism and the image opening 14 before impinging on the film extending across the image opening 14 as described.

Figure 11:
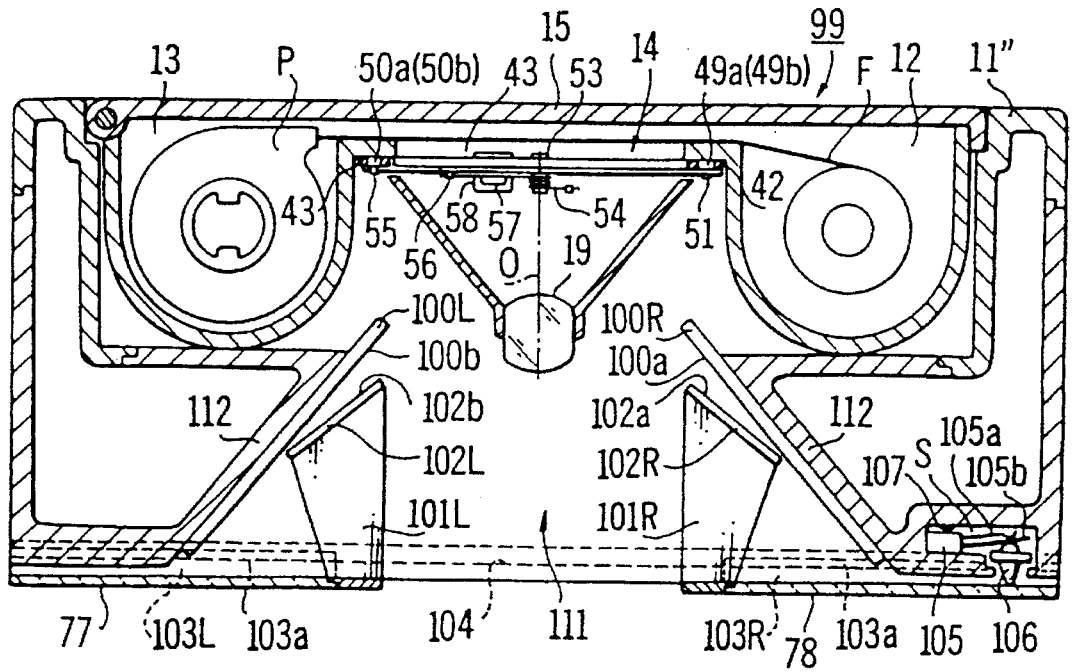
FIG. 11 is a cross-sectional plan view of the third embodiment of a stereoscopic camera, showing a second state.

Sliding windows 77 and 78 are arranged to be slidable relative to the camera body 11" in opposite directions, and perpendicular to the optical axis O. In FIG. 10, the sliding windows 77 and 78 are shown at a fully closed position. FIG. 11 shows a first condition of the camera 99, with the sliding windows 77 and 78 at a fully open position. The sliding windows 77 and 78 are formed with plate members 101L and 101R respectively, extending into the camera body 11" and supporting respective secondary mirrors 102L and 102R. Each sliding window 77, 78 is provided with guide members 103, 103 at top and bottom as shown in FIG. 14. Each guide member 103 has a guide ridge 103a, which mates with a respective linear guide channel 104 provided to the unit body 11". The guide channels 104 are perpendicular to the optical axis, and the sliding windows are thereby slidable in a direction perpendicular to the optical axis by virtue of sliding contact between the guide ridges 103a and the guide channels 104.

The camera body 11" is provided with a pair of fixed mirrors 100L, 100R, and a pair of slidable mirrors 102L, 102R. The slidable mirrors 102L and 102R move when the sliding windows 77 and 78 are moved. The pairs of mirrors 100L, 100R and 102L, 102R are symmetrical on either side of the optical axis O. Each of the fixed mirrors 100L, 100R is fixedly mounted to a respective inclined portion 112L, 112R of the unit body 11".

The slidable mirrors 102L, 102R are provided directly on either side of the optical axis O. The slidable mirrors 102L, 102R are angled with reference to the image opening 14. Each of the slidable mirrors 102L, 102R is provided to a plate member 101L, 101R, respectively, as previously described and therefore move when the sliding windows 77, 78 are moved. The slidable mirrors 102L, 102R are thereby restricted to be slidable perpendicular to the optical axis O.

As shown in FIGS. 10 through 13, a reflective side 100b, 100a of each of the fixed mirrors 100L, 100R, respectively, is at an angle to both the optical axis O and the window plate 26. The reflective sides 100b and 100a shown in FIGS. 10 and 12 operate in a manner analogous to the reflective surfaces 4a and 4b, respectively, as shown in FIG. 1. Further, when the sliding windows 77, 78 are in a closed condition, a reflective side 102b, 102a of each of the slidable mirrors 102L, 102R, respectively, faces the reflective side 100b, 100a and is at an angle to the image opening 14. When the sliding windows 77, 78 are in a closed condition, the reflective sides 102b and 102a shown in FIGS. 10 through 13 operate in a manner analogous to the reflective surfaces 3a and 3b, respectively, as shown in FIG. 1.

Figure 13:
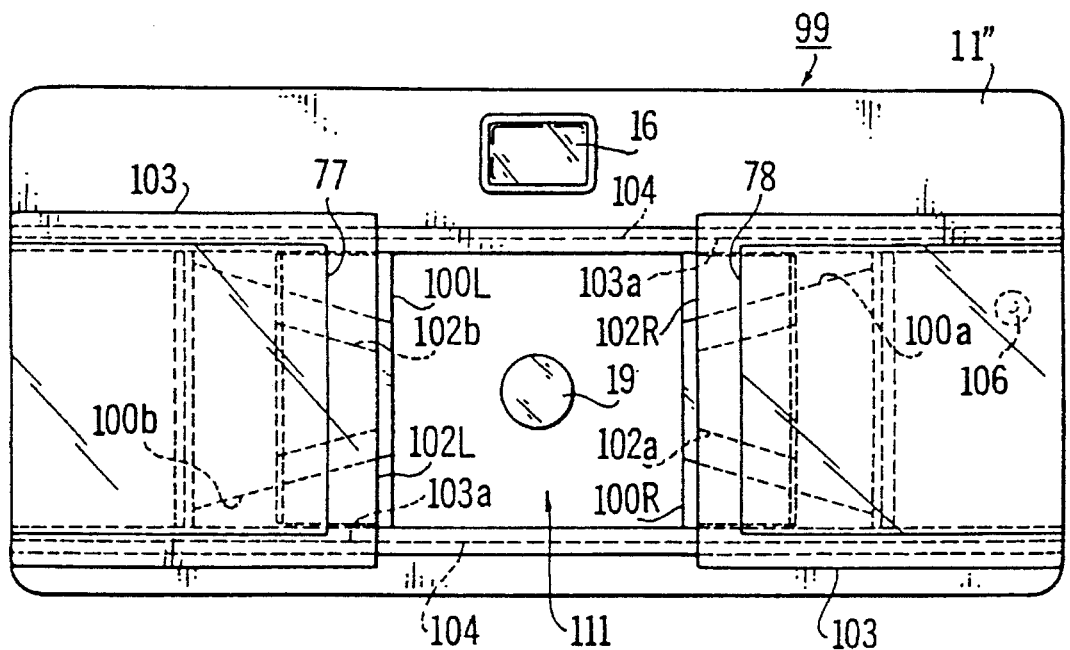
FIG. 13 is a front view of the third embodiment of a stereoscopic camera, showing the second state.

A path by which light travels, through the lens 19 and the image opening 14 to form an image on the film, exists in front of the lens 19. When the sliding windows 77, 78 are open, as shown in FIGS. 11 and 13, the mirrors 102L and 102R are slid to the left and right sides, away from the optical axis O. Thus, the mirrors 100L, 100R, 102L, and 102R are removed from the aforementioned light path, and normal full-frame photographs may be taken.

The third embodiment further comprises a switch 107 to detect when the camera 99 is in a stereoscopic mode or normal mode. As shown in FIG. 10, a contact switch 105 is housed in a switching chamber S in the unit body 11" of the camera 99. The contact switch 105 includes resilient contacts 105a and 105b facing the front of the camera 99. A tapered movable member 106 is provided to the switching chamber S in front of the contacts 105a and 105b. As shown in FIG. 11, when the sliding window 78 is moved to an open position, the rear surface of the sliding window 78 pushes the movable member 106, which in turn forces the contact 105b to touch the contact 105a, closing the contact switch 105 and sending a signal indicating that the camera is in normal photographing mode.

The third embodiment is also provided with a panorama framing mechanism and a finder mechanism. The panorama framing mechanism enables the camera to take wide, narrow photographs, in this case 13×36 mm, where a full frame photograph is 24×36 mm.

Figure 14A:
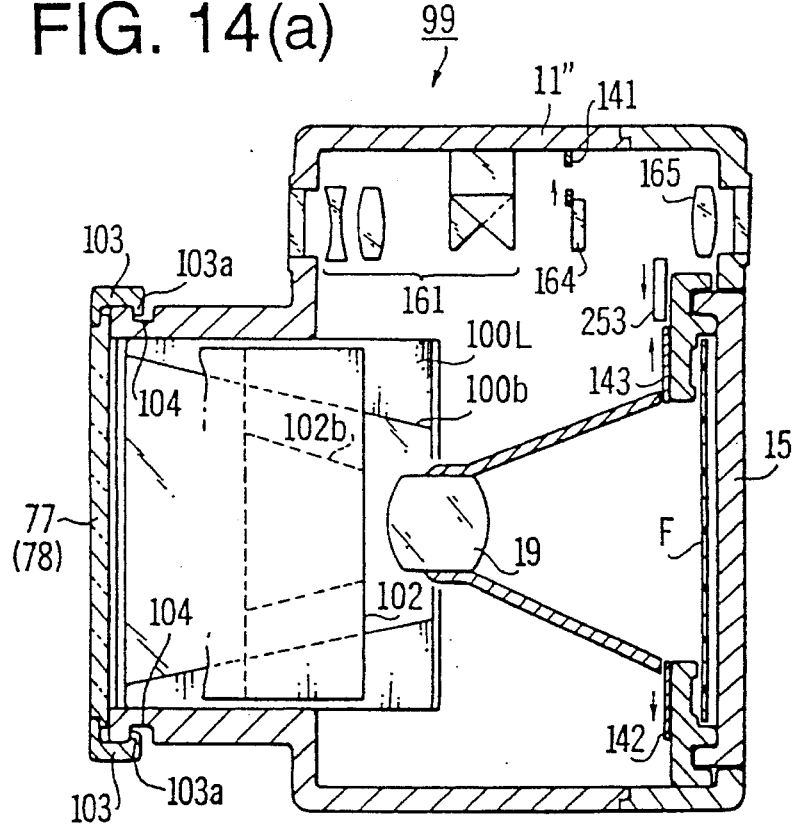
FIG. 14(a) is a side cross-sectional view of the third embodiment of a stereoscopic camera, showing a first embodiment of a stereoscopic magnifying/framing system in a normal photographic position.
Figure 14B:
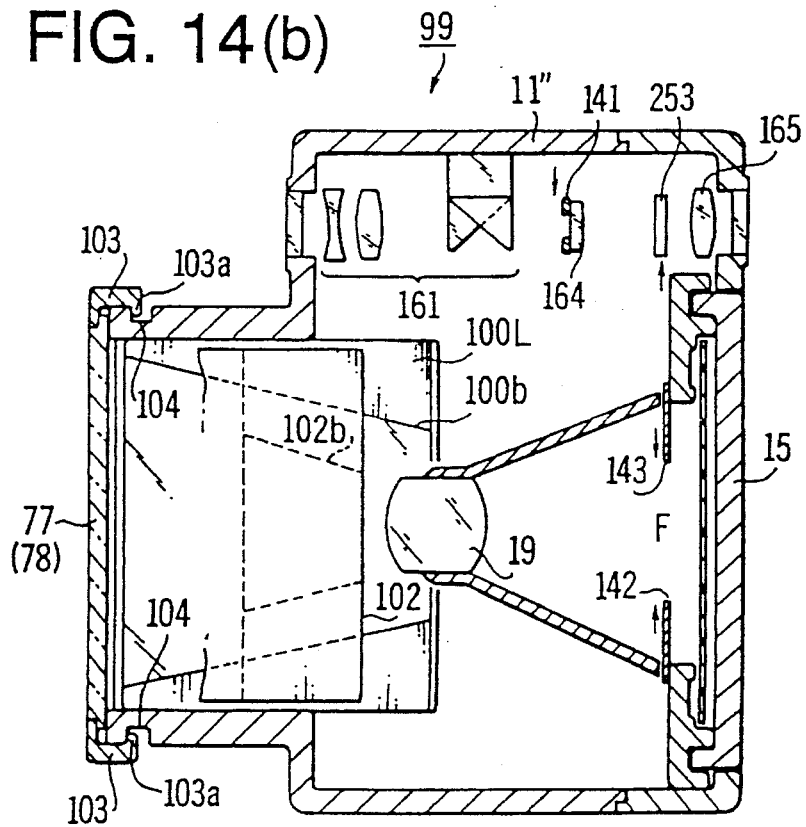
FIG. 14(b) is a side cross-sectional view of the third embodiment of a stereoscopic camera, showing the first embodiment of a stereoscopic magnifying/framing system in a stereoscopic photographic position.
Figure 22A:
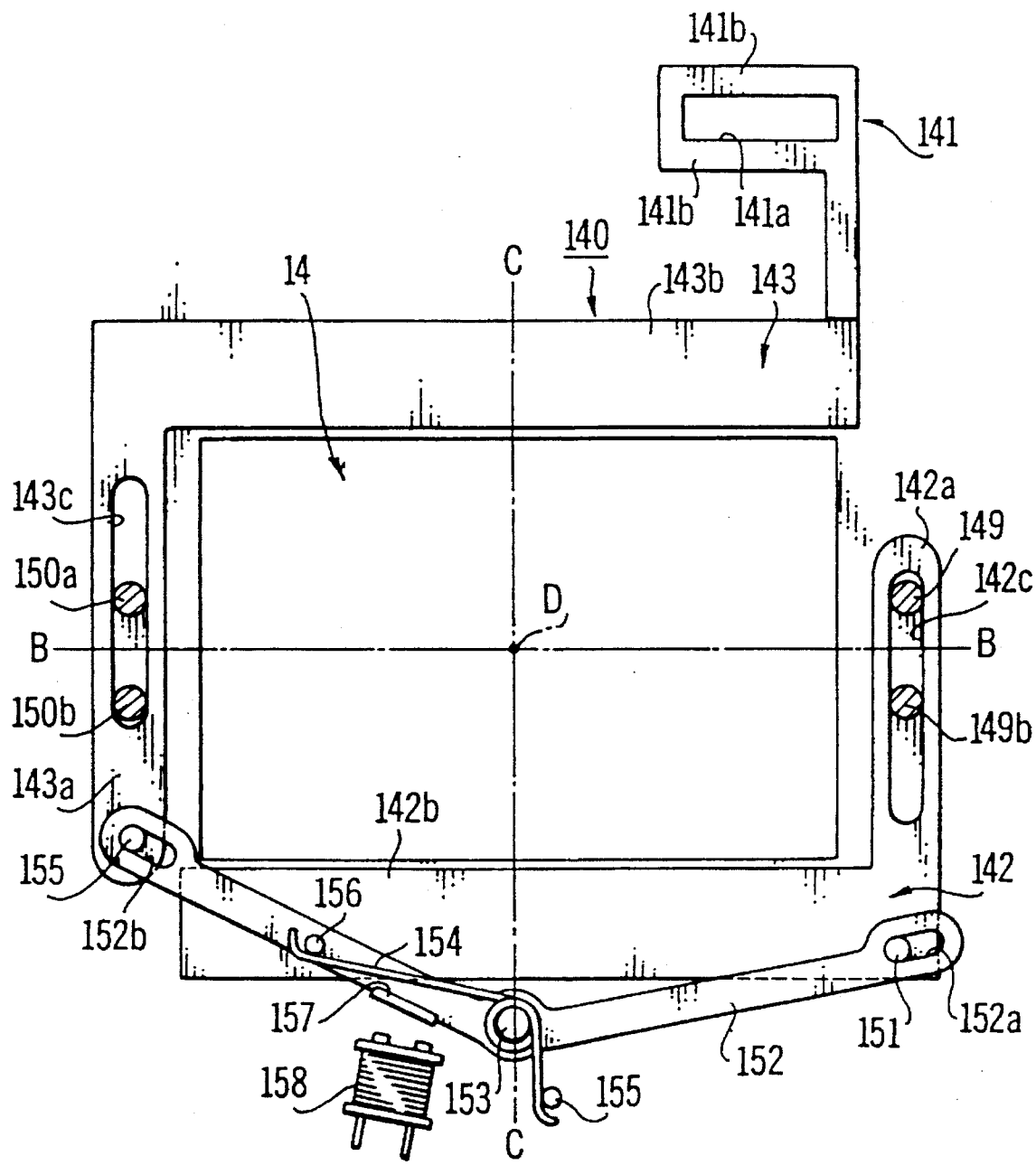
FIG. 22(a) is an isolated front view of a panorama framing mechanism, showing a normal framing position.
Figure 22B:
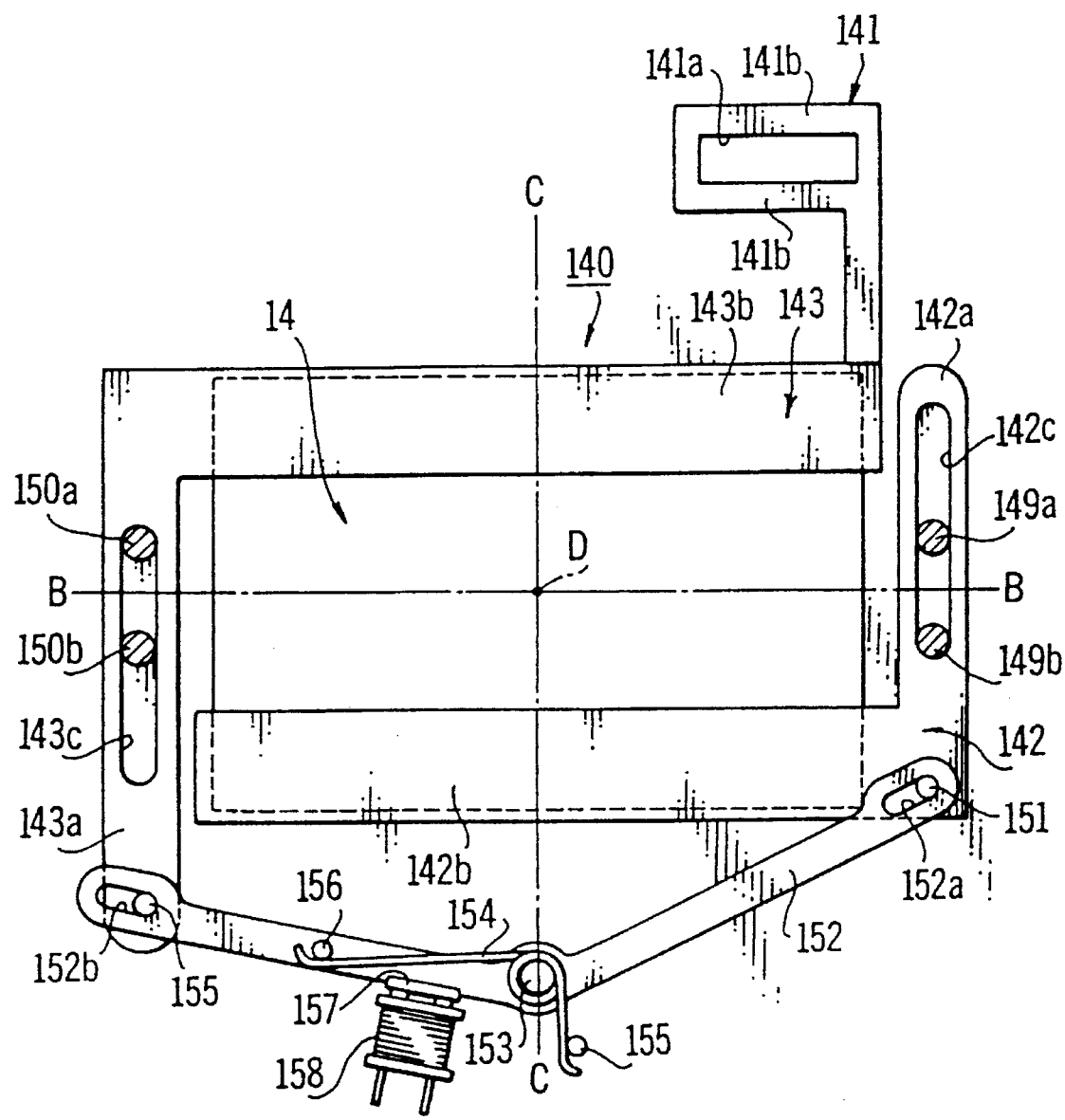
FIG. 22(b) is an isolated front view of a panorama framing mechanism, showing a panorama framing position.

The panorama framing mechanism 140 appears in FIGS. 10, 11, 14(a) and 14(b), and is shown in an isolated front view in FIGS. 22(a) and 22(b). FIGS. 22(a) and 14(a) show the panorama framing mechanism 140 in a normal framing position, and FIGS. 22(a) and 14(b) shown the panorama framing mechanism 140 in a panorama framing position.

As shown in FIGS. 22(a) and 22(b), the panorama framing mechanism includes top plate 143, bottom plate 142, link arm 152, and electromagnet 158. A finder frame 141 is provided to the top plate arm 143.

The top plate 143 is formed in an L shape, with a horizontal plate 143b extending parallel with the width of the image opening 14, and a vertical plate 143a extending parallel to the height of the image opening 14. The vertical plate 143a is provided with a guide groove 143c, and is vertically slidable by means of guide pins 150a and 150b. The guide pins 150a and 150b are attached to the unit body 11" (not shown), and limit the range of movement of the top plate 143. The top plate 143 is further provided with a drive pin 155 at the bottom of the vertical portion 143a. The top plate 143 also has an attached finder cropping frame 141, which is disposed to be above and clear of a finder optical path when the panorama framing mechanism is in the normal framing position. The finder cropping frame 141 includes top and bottom portions 141b, 141b, and an aperture 141a.

The bottom plate 142 is similarly formed in an L shape, with a horizontal plate 142b extending parallel with the width of the image opening 14, and a vertical plate 142a extending parallel to the height of the image opening 14. The vertical plate 142a is provided with a guide groove 142c, and is vertically slidable by means of guide pins 149a and 149b. The guide pins 149a and 149b are attached to the unit body 11", and limit the range of movement of the bottom plate 142. The bottom plate 142 is further provided with a drive pin 151 at the bottom of the vertical portion 143a.

Figure 21:
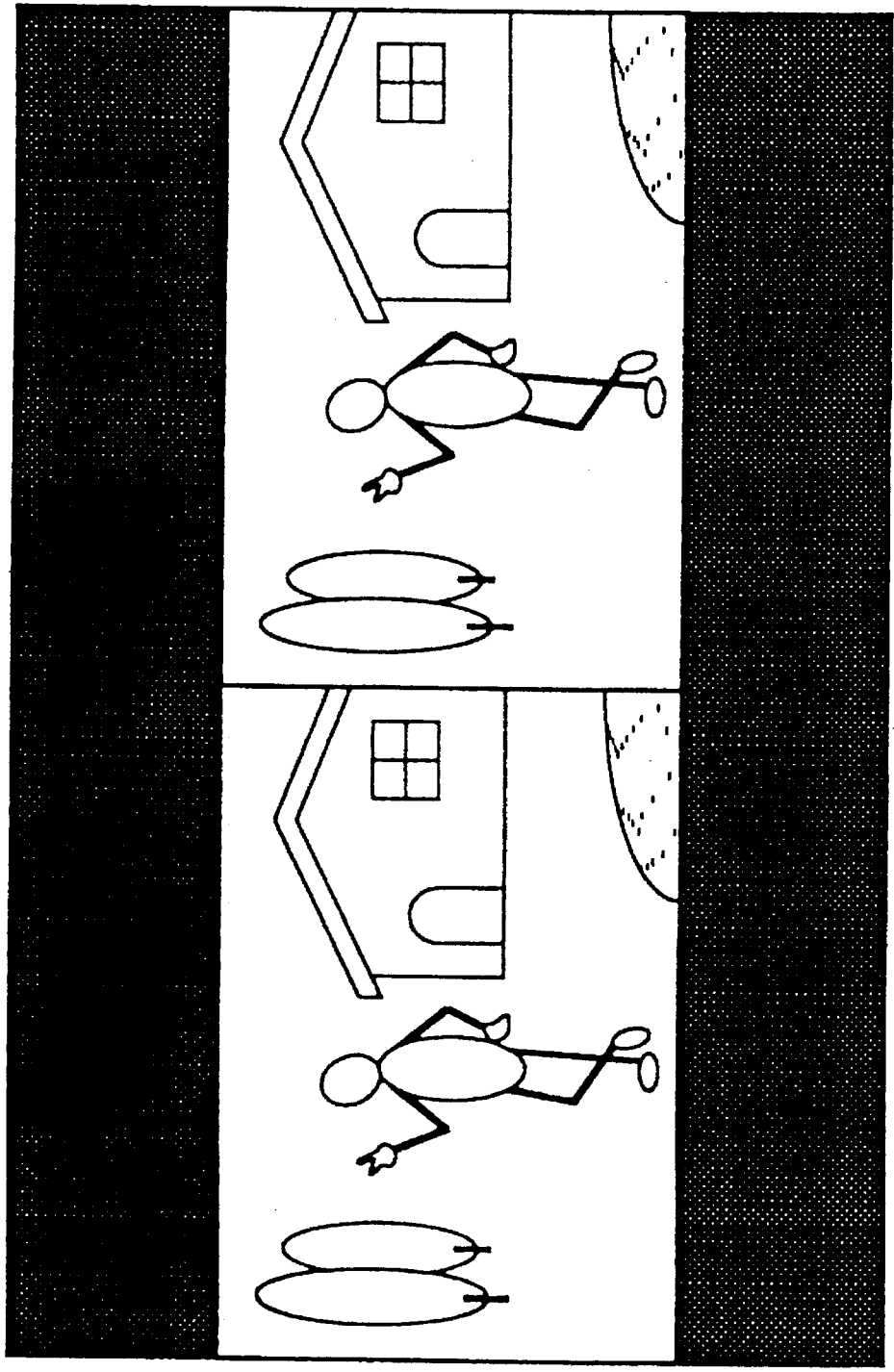
FIG. 21 shows a simplified picture taken in panorama framing, stereoscopic photography mode.

The top plate drive pin 155 and the bottom plate drive pin 151 are linked to the link arm 152 at guide grooves 152a and 152b respectively. The link arm 152 is rotatable about an axis 153 near the lengthwise center of the link arm 152. The axis 153 is attached to the unit body 11". When the link arm 152 is rotated clockwise, the plates 243 and 142 move to the normal framing position shown in FIG. 21, and when the link arm is rotated counter clockwise, the plates 143 and 142 move to the panorama framing position shown in FIG. 22.

The axis 153 is provided with a torque spring 154, one end of the torque spring 154 pressing a pin 156 on the link arm 142 and the remaining end of the torque spring 154 pushing on a pin 155 attached to the unit body 11, such that the link arm is biased in a clockwise direction. A ferromagnetic attraction plate 157 is provided to the link arm, and the electromagnet 158 is provided to the unit body 11" proximate to the attraction plate 157.

Figure 27:
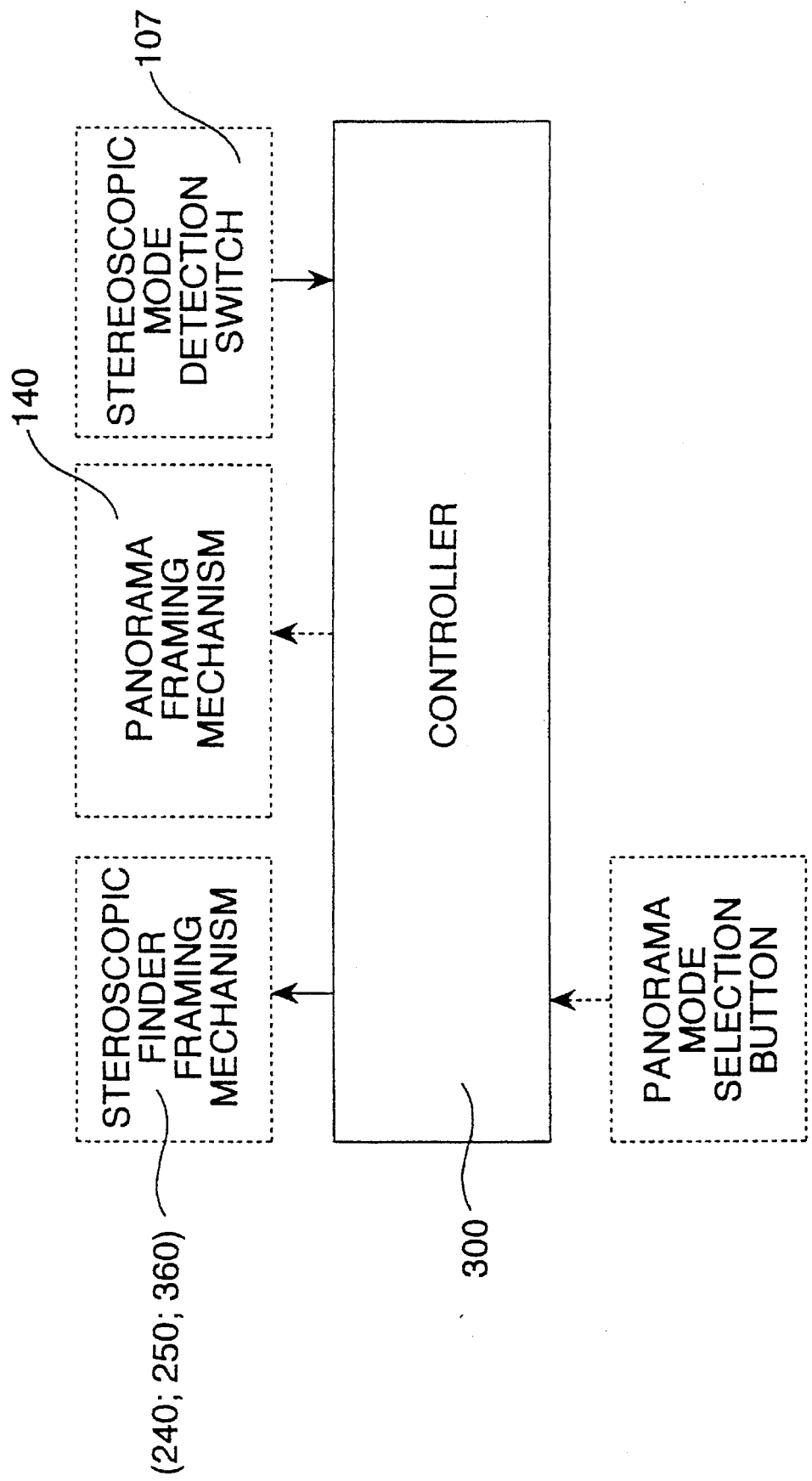
FIG. 27 is a block diagram of a control means for a stereoscopic camera.

(As shown in FIG. 27.) the controller 300 is associated with the panorama framing mechanism 140 and a panorama mode selection button. When the controller 300 determines that panorama framing has been selected, the controller 300 turns ON the electromagnet 158, which attracts the attraction plate 157 and pulls the link arm 152 counterclockwise, closing the plates 143 and 144 to be panorama framing position shown in FIG. 22(b), and blocking the incident light so that a panorama frame may be exposed. The finder cropping frame 141 is brought into the finder optical path, so that the view in the finder 16 matches the picture to be taken. When the controller 300 determines that panorama framing is no longer selected, the electromagnet 158 is OFF, and the plates 143 and 142 are returned to the position shown in FIG. 22(a) by the bias of the torsion spring 154, and the finder cropping frame 141 leaves the finder optical path.

Figure 12:
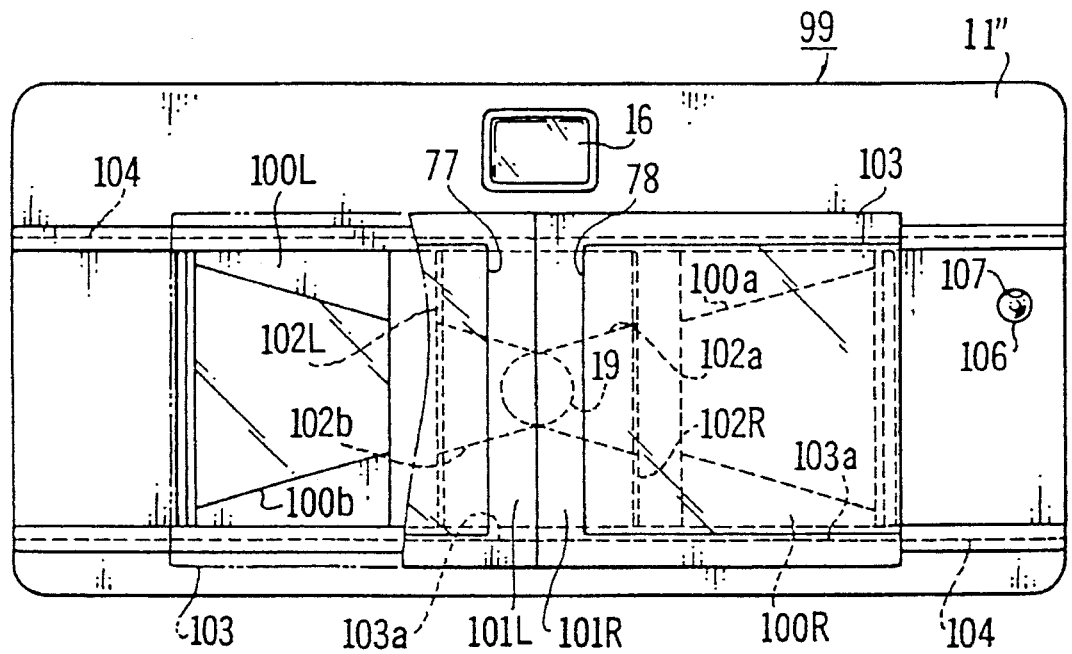
FIG. 12 is a front view of the third embodiment of a stereoscopic camera, showing the first state.

As shown in FIG. 12, a finder 16 is found in the upper part of the front of the camera body 11". An object to be photographed through the lens 19 is observed through the finder 16 provided in the camera body 11".

Figure 26:
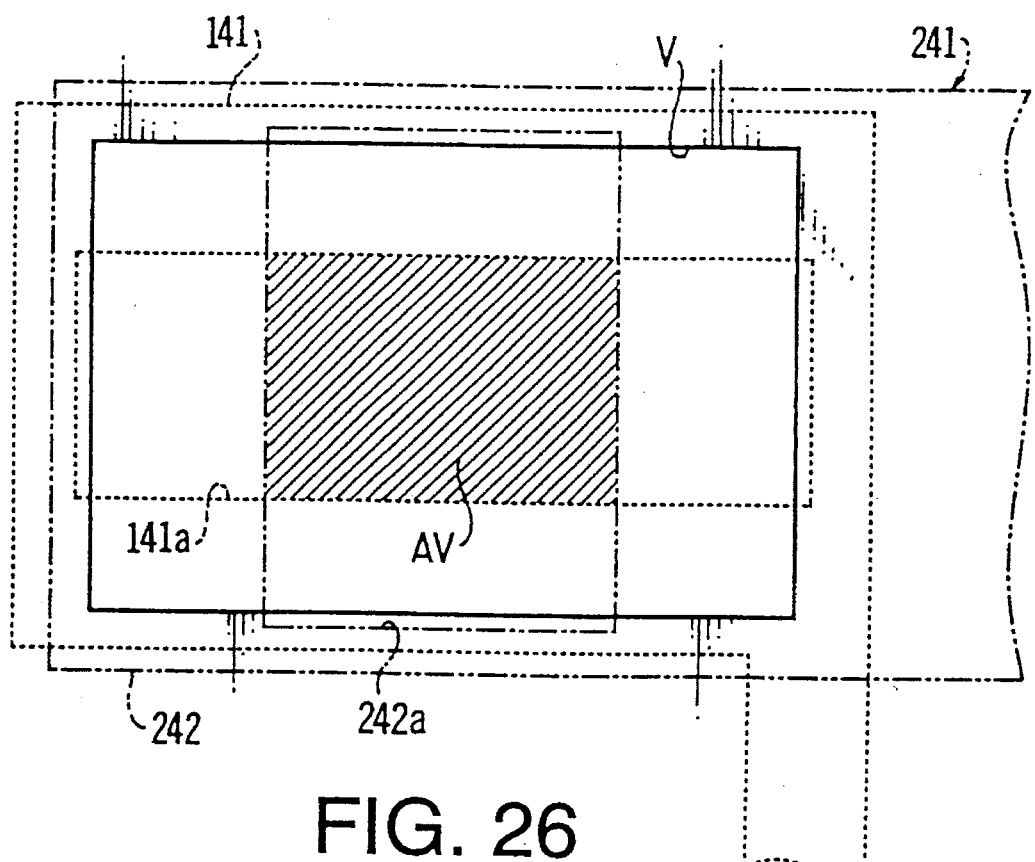
FIG. 26 is a schematic showing full-frame, stereoscopic, and panorama frame sizes and combinations thereof.

The camera 99 may be provided with the stereoscopic finder image framing mechanism 240, previously described in conjunction with the first embodiment. In this case, the stereoscopic finder image framing mechanism 240 corresponds to "Finder Framing Mechanism" shown in FIG. 27. Using the mechanism 240, the camera can show any combination of normal or stereoscopic photography and normal or panoramic framing in the finder 16. FIG. 26 shows the visible areas in the finder that result in each case. Area AV shows the combination of stereoscopic photography and panoramic framing; aperture 141a of panorama finder cropping frame 141 (single dashed line) defines the aperture available when normal photography, panorama framing is selected; aperture 242a and blocking portion 242 of stereoscopic finder cropping frame 241 (double dashed line) defines the aperture available when stereoscopic photography, normal framing is selected; and frame V defines the normal photography, normal framing area.

Figure 24:
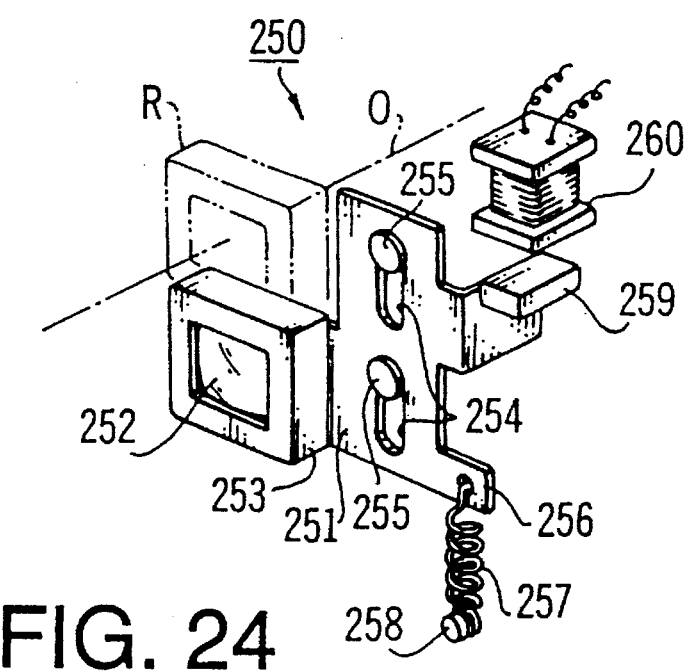
FIG. 24 is a perspective view of a first embodiment of a stereoscopic magnifying/framing mechanism.

The camera 99 is alternatively provided with a first finder image magnifying mechanism 250. In this case, the first finder image magnifying mechanism 250 corresponds to "Finder Framing Mechanism" shown in FIG. 27. The first embodiment of a mechanism 250 to provide a magnified finder image, showing a stereoscopic and panoramic image size is shown in FIG. 24. The normal frame size of film in conventional cameras is, for example, 24×36 mm (2:3). A panoramic photograph as previously described results in a 13×36 mm image on the 24×36 frame, and a stereoscopic photograph as described results in dual 24×18 mm images. A stereoscopic and panoramic photograph results in dual images of approximately 13×18 mm, approaching the 2:3 proportion ratio of a normal 24×36 frame. The 2:3 proportion is of improved appearance. Thus, a finder image may be magnified by 2 when a stereoscopic and panoramic picture is taken, and the framing area visible in the finder is substantially correct. When a finder image magnifying mechanism 250 is used, the controller 300 controls the panorama focal plane framing mechanism 140 in concert, such that a stereoscopic image will always be further masked by the panorama framing system 140.

The first embodiment of a finder image magnifying mechanism 250 in FIG. 24 is placed proximate to the optical path of a finder as shown in FIGS. 14(a) and 14(b). As shown in FIG. 24, the magnifying mechanism 250 comprises a 2:1 magnification lens 252, a movable support frame 251 and an electromagnet 260. The movable support frame includes a lens frame 253, vertical guide grooves 254, a tab 256, and a ferromagnetic attraction portion 259. The lens frame 253 holds the lens 252. The movable frame 251 is supported and guided by pins 255 provided to the unit body 11" (not shown), and the location of the pins 255 defines the vertical movement range of the movable frame 251. The movable frame 251, and therefore lens 252, is movable between a normal photographing position, shown by a solid line in FIG. 24, and a stereoscopic/panoramic photographing position R, shown by a double dashed line in FIG. 24. The normal and stereoscopic/panoramic photographing positions are also shown in FIGS. 14(a) and 14(b), respectively. The frame 251 is biased away from the finder optical path by a tension spring 257 connected between the tab 256 and a pin 258 provided to the unit body 11" (not shown), and is movable between positions by means of the electromagnet 260 and the ferromagnetic portion 259. When the electromagnet 260 is energized, the ferromagnetic portion 259 is attracted, and the lens 152 is moved into position R. The lens 252 returns, leaving the finder optical path, when the electromagnet 260 is de-energized. The electromagnet 260 of the mechanism 250 is controlled by the controller 300.

Figure 14C:
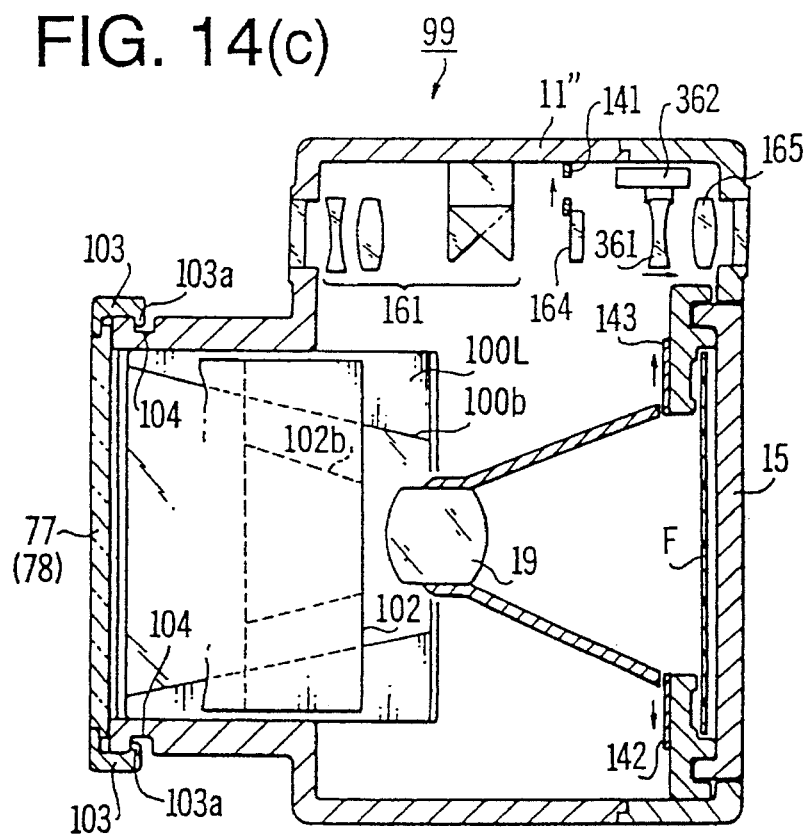
FIG. 14(c) is a side cross-sectional view of the third embodiment of a stereoscopic camera, showing a second embodiment of a stereoscopic magnifying/framing system in a normal photographic position.
Figure 14D:
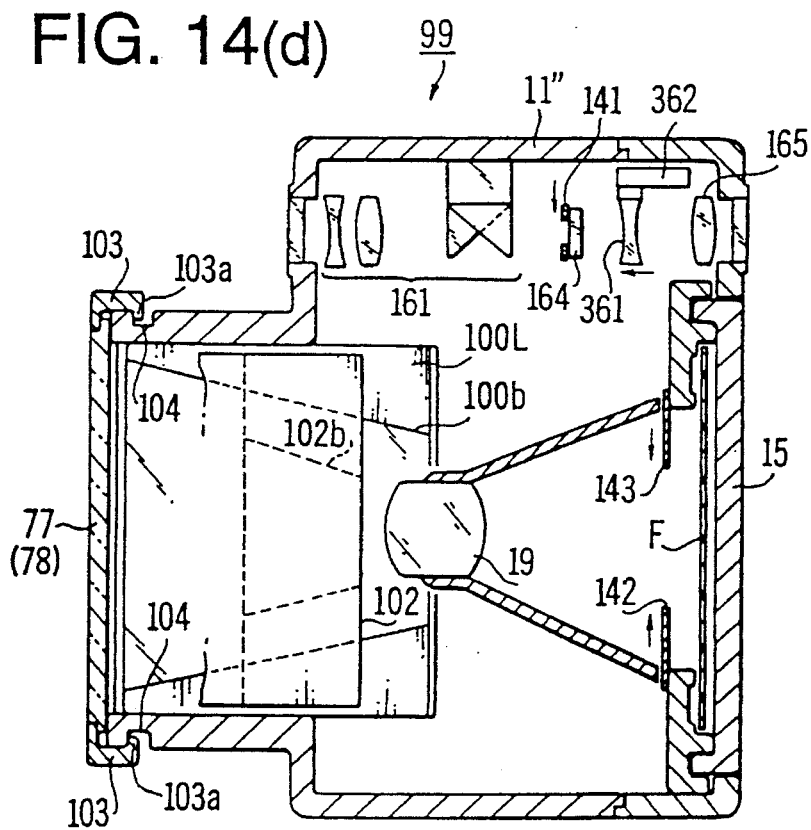
FIG. 14(d) is a side cross-sectional view of the third embodiment of a stereoscopic camera, showing the second embodiment of a stereoscopic magnifying/framing system in a stereoscopic photographic position.
Figure 25:
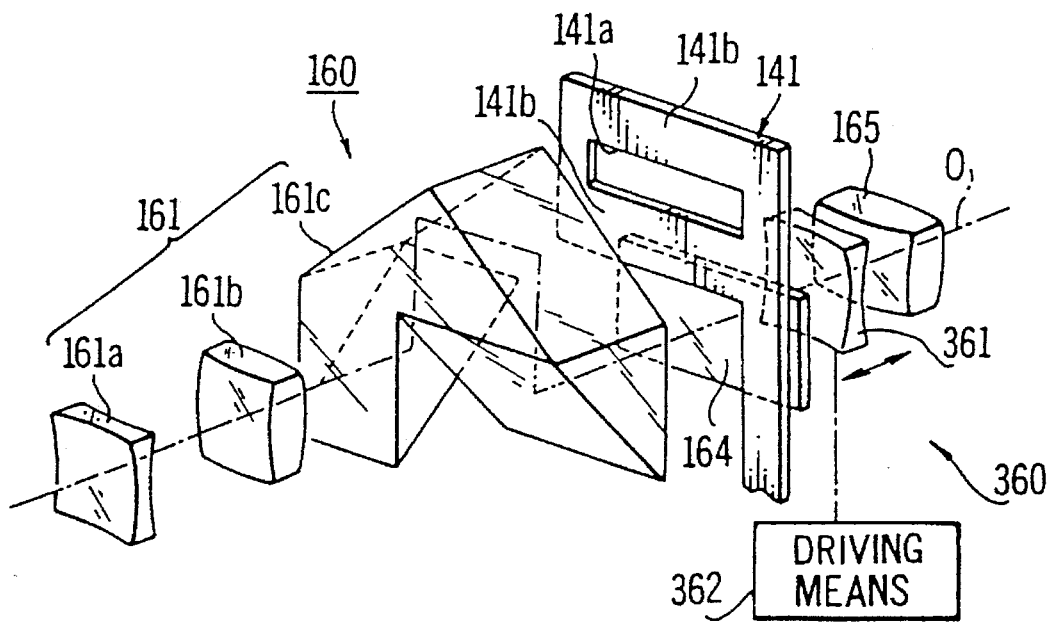
FIG. 25 is a perspective view of a second embodiment of a stereoscopic magnifying/framing system.

The camera 99 is further alternatively provided with a second finder image magnifying mechanism 360. In this case, the second finder image magnifying mechanism 360 corresponds to "Finder Framing Mechanism" shown in FIG. 27. The second embodiment of a mechanism 360 to provide a magnified finder image of a stereoscopic and panoramic image size is shown in FIGS. 25, 14(c) and 14(d), and is placed in the optical path of a finder 160. The finder 160 comprises: a lens system 161, including first and second lenses 161a and 161b and image erecting prism 161c; a finder field 164, and a third lens 165. The panoramic finder frame 141 is also shown in FIGS. 25, 14(c) and 14(d). The mechanism 360 comprises a magnifying lens 361 and a drive means 362. The drive means 362 is a conventional system, for example a rack (not shown) attached to the lens 361 and a pinion and electric motor (not shown). The lens 361 is moved linearly in the finder optical path between a normal image position, shown in FIG. 14(c), and a 2:1 image size position, shown in FIG. 14(d). The 2:1 image size position provides an image in the finder field 363 twice the size of the image provided at the normal size position. The drive means 362 of the mechanism 360 is controlled by the controller 300. When a finder image magnifying mechanism 360 is used, the controller 300 controls the panorama focal plane framing mechanism 140 in concert, such that a stereoscopic image will always be further masked by the panorama framing system 140.

Figure 15:
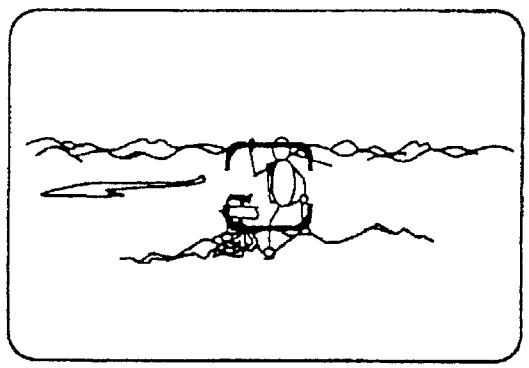
FIG. 15 shows a finder field for normal framing, ordinary photography.
Figure 16:
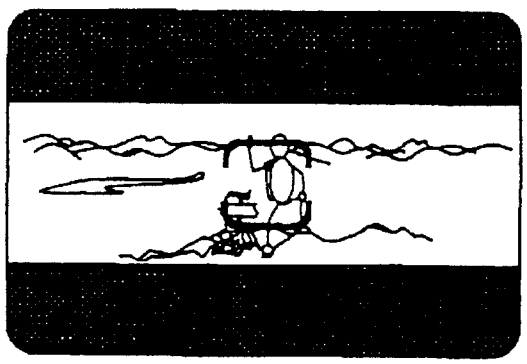
FIG. 16 shows a finder field for panorama framing, normal photography.
Figure 17:
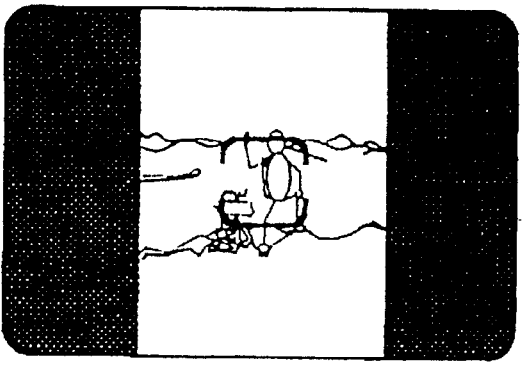
FIG. 17 shows a finder field for normal framing, stereoscopic photography.
Figure 18A:
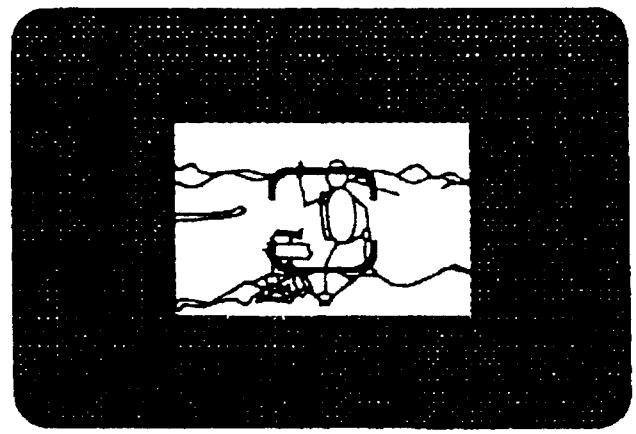
FIG. 18(a) shows a finder field for panorama framing, stereoscopic photography.
Figure 18B:
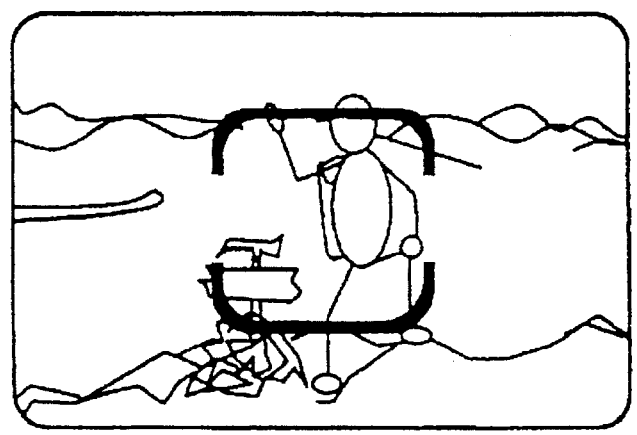
FIG. 18(b) shows a magnified finder field for panorama framing, stereoscopic photography.
Figure 19:
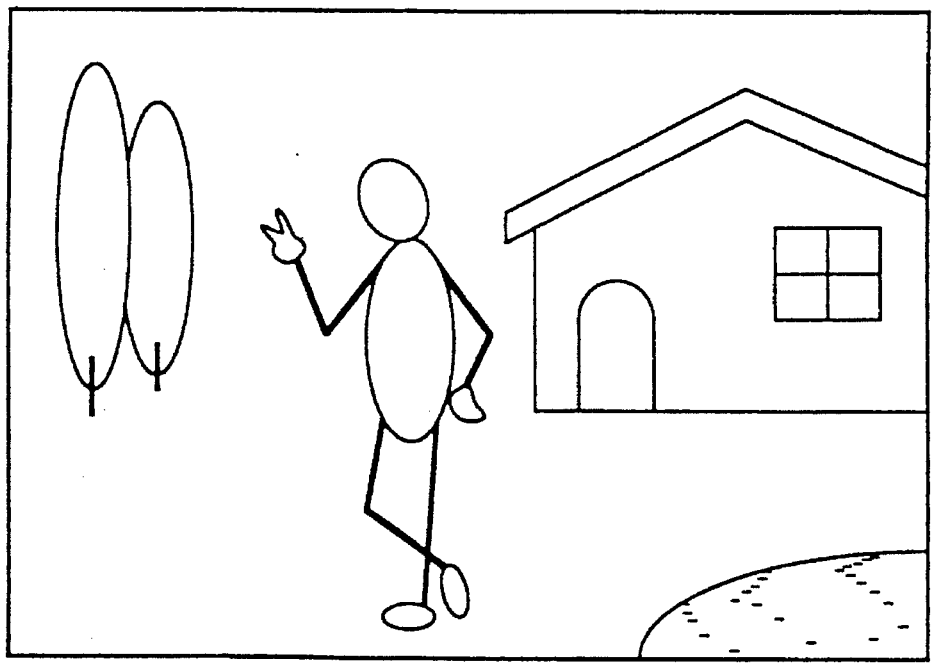
FIG. 19 shows a simplified picture taken in normal framing, normal photography mode.
Figure 20:
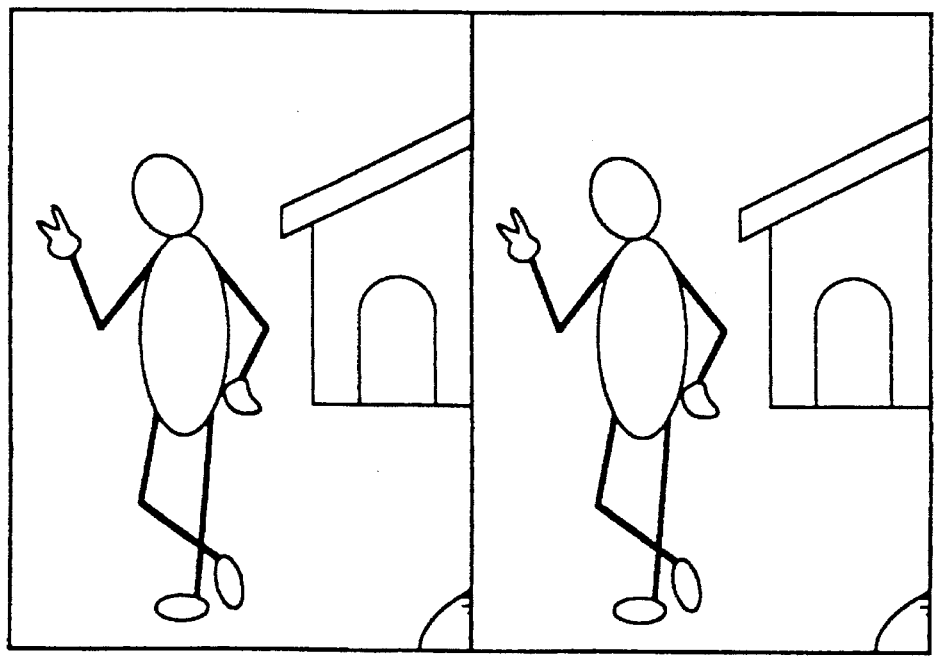
FIG. 20 shows a simplified picture taken in normal framing, stereoscopic photography mode.

When the camera 99 is used in a normal framing, normal photographing mode, the finder field view in the finder 16 appears as shown in FIG. 15, with no particular notification to the photographer. When the camera is used in a panorama framing, normal photographing mode, the finder field view in the finder 16 appears as shown in FIG. 16, with barriers showing the extent of the panorama framing. When the camera is used in a normal framing, stereo photographing mode, the finder field view in the finder 16 appears as shown in FIG. 17, with a visible notification that the camera 99 is in stereo mode, using a known LCD display, and a mask showing the extent of the stereo photograph. When the camera is used in a panorama framing, stereo photographing mode, using the stereoscopic finder framing mechanism 240 (FIG. 23) the finder field view in the finder 16 appears as shown in FIG. 18(a), with the panorama barriers, stereo mask, and the visible notification that the camera 99 is in stereo mode. When the camera is used in a panorama framing, stereo photographing mode, using one of the stereoscopic finder magnifying mechanism 250 (FIG. 24) or magnifying mechanism 360 (FIG. 25), the finder field view in the finder 16 appears as shown in FIG. 18(a), with the magnified finder image and the visible notification that the camera 99 is in stereo mode. FIG. 19 shows a simplified normal photograph. A stereoscopic photograph as taken by the camera 99 appears in FIG. 20, with the left and right views differing slightly by perspective (parallax) such that the stereoscopic photograph may be viewed with a conventional stereoscopic viewer. A panoramic, stereoscopic photograph appears in FIG. 21, and the panoramic, stereoscopic photograph may also be viewed with a conventional stereoscopic viewer.

With the sliding windows 77 and 78 closed (FIG. 10), in order to take a stereoscopic photograph, the light from the object to be photographed enters the camera 99 through the windows 77 and 78, is reflected by surfaces 100b, 100a and then 102b, 102a, respectively. In this position of the windows 77 and 78, the "stereo" message appears in the finder field as shown in FIG. 17. The left and right images cross over as they are focused by the lens 19, and are projected onto the correct side of the film through the image opening 14. The photographer presses a conventional release button (not shown) on the camera 10, and an exposure is taken through the lens 19 by a conventional shutter mechanism (not shown), as the light enters the camera 10 as shown in FIG. 1.

When the photographer wishes to take a normal full-frame photograph or full-frame panorama mode photograph, the sliding windows 77 and 78 are slid away from the optical axis O. The top and bottom guide channels 104, 104 of each of the sliding windows 77 and 78 guide the guide ridges 103a, 103a, and the mirrors 102L, 102R slide perpendicularly away from the optical axis. An optical path in front of the lens 19 is thereby opened by the motion of the mirrors 102L, 102R, and the camera 99 is ready to take normal full-frame photographs (FIG. 11). When the sliding window 78 is slid to the side, the contact switch 105 is actuated, and the "stereo" message is removed from the finder field. The photographer presses a conventional release button (not shown) on the camera 99, and an exposure is taken through the lens 19 by a conventional shutter mechanism (not shown), as light enters the camera 99 through the lens 19. If the camera 99 is provided with a stereoscopic finder framing or magnifying mechanism 140, 240, or 360, when the contact switch 105 is actuated, the controller 300 deactivates the stereoscopic finder framing or magnifying mechanism, and the finder field appears with the correct proportions.

When the photographer wishes to take a stereoscopic picture, the sliding windows 77 and 78 are slid into the optical path O. The top and bottom guide channels 104, 104 of each of the sliding windows 77 and 78 guide the guide ridges 103a, 103a, and the mirrors 102L, 102R slide perpendicularly towards from the optical axis. An stereoscopic optical path in front of the lens 19 is thereby provided by the placement of the mirrors 102L, 102R, and the camera 99 is ready to take stereoscopic photographs (FIG. 10). When the sliding window 78 is slid to the center, the contact switch 105 is released, and the "stereo" message appears in the finder field. The photographer presses a conventional release button (not shown) on the camera 99, and an exposure is taken through the lens 19 by a conventional shutter mechanism (not shown), as light enters the camera 99 through the lens 19. If the camera 99 is provided with a stereoscopic finder framing or magnifying mechanism 140, 240, or 360, when the contact switch 105 is released, the controller 300 activates the stereoscopic finder framing or magnifying mechanism, and the finder field appears with the correct proportions.

Thus, the third embodiment of a stereoscopic camera 99 is able to take normal and stereoscopic photographs in either of a normal or panoramic framing modes, and to properly frame the finder image for any mode. Furthermore, the third embodiment of a stereoscopic camera 99 is able to switch between a normal and a stereoscopic photographing mode with a simple motion and few moving parts.

The present disclosure relates to subject matter contained in Japanese Patent Application No. HEI 05-322878, filed on Dec. 21, 1993, which is expressly incorporated herein by reference in its entirety.

What is claimed is:

1. A camera having a stereoscopic photographing system, said system comprising:

a photographing lens;

a first pair of reflection members;

a second pair of reflection members; and a retraction mechanism, associated with at least said second pair of reflection members, said mechanism having a retracted position where at least said second pair of reflecting members are retracted away from each other such that light from said object to be photographed is directly incident on said photographing lens, and wherein when said retraction mechanism is in an unretracted position, said first pair of reflecting members reflects said light from an object to be photographed to be incident on said second pair of reflecting members, and said second pair of reflecting members reflects light incident on said second pair of reflecting members towards said photographing lens to be incident on said photographing lens.

2. The camera according to claim 1, said system further comprising a film plane bearing a film, said film plane arranged behind said lens, wherein a full-frame image is formed on said film when said retraction mechanism is in said retracted position, and wherein a stereoscopic image comprising side by side correspondent images is formed on said film when said retraction mechanism is in said unretracted position.

3. The camera according to claim 2, said system further comprising:

an image opening, said image opening defining a maximum size of an image to be formed on said film, said image opening formed between said lens and said film; and means for selectively blocking at least part of said image opening, said blocking means arranged between said lens and said film, such that a size of said image formed on said film is defined by said image opening and said blocking means.

4. The camera according to claim 3, said system further comprising:

a finder, wherein a finder image in said finder corresponds to said maximum size of an image to be formed on said film;

means for altering a finder image visible in said finder, wherein said means for altering alters said finder image such that said finder image corresponds to said image to be formed on said film.

5. The camera according to claim 4, wherein said altering means comprises at least one masking portion to block a part of said finder image corresponding to a blocked portion of said image to be formed on said film.

6. The camera according to claim 4, wherein said altering means comprises magnifying means to magnify said finder image such that said magnified finder image corresponds to said image to be formed on said film.

7. The camera according to claim 1, said retraction mechanism comprising:

a collapsible housing, having an inner and an outer portion, said inner portion slidable relative to said outer portion, said inner portion being pushed into said outer portion when said collapsible housing is collapsed, and said inner housing being pulled away from said outer housing to protrude from said outer housing when said collapsible housing is expanded;

a sliding mechanism, provided to said second pair of reflecting members and associated with said collapsible housing, for sliding each reflective member of said second pair of reflecting members away from an optical axis of said photographing lens when said collapsible housing is collapsed.

8. The camera according to claim 7, said sliding mechanism comprising:

a first guide plate provided to said inner portion of said collapsible housing, said first guide plate having at least one diagonal guide groove formed therein, said at least one diagonal guide groove being diagonal to said optical axis;

a second guide plate provided to said outer portion of said collapsible housing, said second guide plate having a perpendicular guide groove formed therein, said perpendicular guide groove being perpendicular to said optical axis; and at least one guide pin provided to each member of said second pair of reflecting members, said at least one guide pin being commonly engaged with said at least one diagonal guide groove and said perpendicular guide groove, wherein when said collapsible housing is collapsed, said at least one guide pin is guided by said at least one diagonal guide groove and said perpendicular guide groove, and each reflective member of said second pair of reflecting members is slid away from an optical axis of said photographing lens.

9. The camera according to claim 7, said retraction mechanism further comprising:

a swinging mechanism, provided to said first pair of reflecting members and associated with said collapsible housing, for swinging each reflective member of said first pair of reflecting members towards said inner portion of said collapsible housing when said collapsible housing is collapsed.

10. The camera according to claim 9, said swinging mechanism comprising:

at least one axis, provided to one edge of each member of said first pair of reflecting members, each member of said first pair of reflecting members swingable about said at least one axis;

a pair of contact members, each contact member of said pair of contact members provided to a remaining edge of each member of said first pair of reflecting members; and at least one biasing member, provided to said first pair of reflecting members, for biasing said first pair of reflecting members to swing towards said outer housing, wherein contact between said contact members and said outer housing swings each reflective member of said first pair of reflecting members, against the bias of said at least one biasing member, towards said inner portion of said collapsible housing when said collapsible housing is collapsed, and wherein said first pair of reflecting members are biased by said at least one biasing member such that said contact members remain in contact with said outer housing when said collapsible housing is expanded.

11. The camera according to claim 1, said retraction mechanism comprising:

a camera housing; and a pair of transparent sliding windows, provided to said housing and slidable relative to said housing, each window of said pair of sliding windows slidable in a direction away from an optical axis of said photographing lens and perpendicular to said optical axis of said photographing lens, and wherein each of said second pair of reflective members is associated with a respective window of said pair of sliding windows, such that each reflective member of said second pair of reflecting members is movable away from said optical axis of said photographing lens.

12. The camera according to claim 11, said system further comprising:

a detection switch, for detecting a position of at least one sliding window of said pair of sliding windows.

13. The camera according to claim 12, said system further comprising a film plane bearing a film, said film plane arranged behind said lens, wherein a full-frame image is formed on said film when said retraction mechanism is in said retracted position, and wherein a stereoscopic image comprising side by side correspondent images is formed on said film when said retraction mechanism is in said unretracted position.

14. The camera according to claim 13, said system further comprising:

an image opening, said image opening defining a maximum size of an image to be formed on said film, said image opening formed between said lens and said film; and means for selectively blocking at least part of said image opening, said blocking means arranged between said lens and said film, such that a size of said image formed on said film is defined by said image opening and said blocking means.

15. The camera according to claim 14, said system further comprising:

a finder, wherein a finder image in said finder corresponds to said maximum size of an image to be formed on said film;

means for altering a finder image visible in said finder, wherein said means for altering alters said finder image such that said finder image corresponds to said image to be formed on said film.

16. The camera according to claim 15, wherein said altering means comprises at least one masking portion to block a part of said finder image corresponding to a blocked portion of said image to be formed on said film.

17. The camera according to claim 15, wherein said altering means comprises magnifying means to magnify said finder image such that said magnified finder image corresponds to said image to be formed on said film.

18. A camera having a stereoscopic photographing system, said system comprising:

a camera housing;

a photographing lens;

a first pair of reflection members;

a second pair of reflection members, wherein said first pair of reflection members reflects light from an object to be photographed to be incident on said second pair of reflecting members, and said second pair of reflecting members reflects light incident on said second pair of reflecting members towards said photographing lens to be incident on said photographing lens;

a pair of transparent sliding windows, provided to said housing and slidable relative to said housing, each window of said pair of sliding windows slidable in a direction away from an optical axis of said photographing lens and perpendicular to said optical axis of said photographing lens; and means for moving each of said second pair of reflective members, wherein each of said second pair of reflective members is associated with a respective window of said pair of sliding windows, such that each reflective member of said second pair of reflecting members is moved by said moving means in association with a respective window of said pair of sliding windows in opposing directions away from said optical axis of said photographing lens.

19. A camera having a stereoscopic photographing system, said system comprising:

a photographing lens;

a first pair of reflection members;

a second pair of reflection members, wherein said first pair of reflecting members reflects said light from an object to be photographed to be incident on said second pair of reflecting members, and said second pair of reflecting members reflects light incident on said second pair of reflecting members towards said photographing lens to be incident on said photographing lens;

a collapsible housing, having an inner and an outer portion, said inner portion slidable relative to said outer portion, said inner portion being pushed into said outer portion when said collapsible housing is collapsed, and said inner portion being pulled to protrude from said outer portion when said collapsible housing is expanded; and a first retraction mechanism, associated with said collapsible housing, for retracting said second pair of reflecting members, said first retraction mechanism having a retracted position and an unretracted position, and said second pair of reflection members reflecting light incident on said second pair of reflecting members towards said photographing lens to be incident on said photographing lens when said first retraction mechanism is in said unretracted position, wherein said first retraction mechanism is moved to said retracted position when said collapsible housing is collapsed, and is returned to said unretracted position when said collapsible housing is expanded.

20. The camera according to claim 19, said first retraction mechanism comprising a swinging mechanism for swinging each reflective member of said second pair of reflecting members towards said inner portion of said collapsible housing when said collapsible housing is collapsed, said swinging mechanism comprising:

at least one axis, provided to one edge of each member of said second pair of reflecting members, each member of said second pair of reflecting members swingable about said at least one axis;

a pair of contact members, each contact member of said pair of contact members provided to a remaining edge of each member of said second pair of reflecting members; and at least one biasing member, provided to said second pair of reflecting members, for biasing said second pair of reflective members to swing towards said outer housing, wherein contact between said contact members and said outer housing swings each reflective member of said second pair of reflecting members, against the bias of said at least one biasing member, towards said inner portion of said collapsible housing when said collapsible housing is collapsed, and wherein said second pair of reflecting members are biased by said at least one biasing member such that said contact members remain in contact with said outer housing when said collapsible housing is expanded.

21. The camera according to claim 19, further comprising:

a second retraction mechanism, associated with said collapsible housing, for retracting said first pair of reflecting members, said second retraction mechanism having a retracted position and an unretracted position, and said first pair of reflecting members reflecting light from said object to be photographed to be incident on said second pair of reflecting members when said second retraction mechanism is in said unretracted state, wherein said first retraction mechanism and said second retraction mechanism are moved to said retracted positions when said collapsible housing is collapsed, and are returned to said unretracted positions when said collapsible housing is expanded.

22. The camera according to claim 21, said first retraction mechanism comprising a swinging mechanism for swinging each reflective member of said second pair of reflecting members towards said inner portion of said collapsible housing when said collapsible housing is collapsed, said swinging mechanism comprising:

at least one axis, provided to one edge of each member of said second pair of reflecting members, each member of said second pair of reflecting members swingable about said at least one axis;

a pair of contact members, each contact member of said pair of contact members provided to a remaining edge of each member of said second pair of reflecting members; and at least one biasing member, provided to said second pair of reflecting members, for biasing said second pair of reflective members to swing towards said outer housing, wherein contact between said contact members and said outer housing swings each reflective member of said second pair of reflecting members, against the bias of said at least one biasing member, towards said inner portion of said collapsible housing when said collapsible housing is collapsed, and wherein said second pair of reflecting members are biased by said at least one biasing member such that said contact members remain in contact with said outer housing when said collapsible housing is expanded.

23. The camera according to claim 21, said second retraction mechanism comprising a swinging mechanism for swinging each reflective member of said first pair of reflecting members towards said inner portion of said collapsible housing when said collapsible housing is collapsed, said swinging mechanism comprising:

at least one axis, provided to one edge of each member of said first pair of reflecting members, each member of said first pair of reflecting members swingable about said at least one axis;

a pair of contact members, each contact member of said pair of contact members provided to a remaining edge of each member of said first pair of reflecting members; and at least one biasing member, provided to said first pair of reflecting members, for biasing said first pair of reflective members to swing towards said outer housing, wherein contact between said contact members and said outer housing swings each reflective member of said first pair of reflecting members, against the bias of said at least one biasing member, towards said inner portion of said collapsible housing when said collapsible housing is collapsed, and wherein said first pair of reflecting members are biased by said at least one biasing member such that said contact members remain in contact with said outer housing when said collapsible housing is expanded.

24. A camera having a stereoscopic photographing system, said system comprising:

a collapsible housing, having an inner and an outer portion, said inner portion slidable relative to said outer portion, said inner portion being pushed into said outer portion when said collapsible housing is collapsed, and said inner portion being pulled to protrude from said outer portion when said collapsible housing is expanded;

a photographing lens;

a first pair of reflection members;

a second pair of reflection members, wherein said first pair of reflecting members reflects said light from an object to be photographed to be incident on said second pair of reflecting members, and said second pair of reflecting members reflects light incident on said second pair of reflecting members towards said photographing lens to be incident on said photographing lens;

at least one first axis, provided to one edge of each member of said second pair of reflecting members, each member of said second pair of reflecting members swingable about said at least one first axis;

a pair of first contact members, each contact member of said pair of first contact members provided to a remaining edge of each member of said second pair of reflecting members;

at least one first biasing member, provided to said second pair of reflecting members, for biasing said second pair of reflective members to swing towards said outer housing;

at least one second axis, provided to one edge of each member of said first pair of reflecting members, each member of said first pair of reflecting members swingable about said at least one second axis;

a pair of second contact members, each contact member of said pair of second contact members provided to a remaining edge of each member of said first pair of reflecting members; and at least one second biasing member, provided to said first pair of reflecting members, for biasing said first pair of reflective members to swing towards said outer housing, wherein contact between said first contact members and said outer housing swings each reflective member of said second pair of reflecting members, against the bias of said at least one first biasing member, towards said inner portion of said collapsible housing, and contact between said second contact members and said outer housing swings each reflective member of said first pair of reflecting members, against the bias of said at least one second biasing member, towards said inner portion of said collapsible housing, when said collapsible housing is collapsed, and wherein said second pair of reflecting members are biased by said at least one first biasing member such that said first contact members remain in contact with said outer housing and said first pair of reflecting members are biased by said at least one second biasing member such that said second contact members remain in contact with said outer housing, when said collapsible housing is expanded.

25. The camera according to claim 24, wherein when said collapsible housing is collapsed to a collapsed state from an expanded state having an expanded volume, said camera occupies substantially half the expanded volume.

26. A camera having a stereoscopic photographing system, said system comprising:

a photographing lens;

a first pair of reflection members;

a second pair of reflection members, wherein said first pair of reflecting members reflects said light from an object to be photographed to be incident on said second pair of reflecting members, and said second pair of reflecting members reflects light incident on said second pair of reflecting members towards said photographing lens to be incident on said photographing lens;

a collapsible housing, having an inner and an outer portion, said inner portion slidable relative to said outer portion, said inner portion being pushed into said outer portion when said collapsible housing is collapsed;

a sliding mechanism, provided to said second pair of reflecting members and associated with said collapsible housing, for sliding each reflective member of said second pair of reflecting members away from an optical axis of said photographing lens when said collapsible housing is collapsed; and a swinging mechanism, provided to said first pair of reflecting members and associated with said collapsible housing, for swinging each reflective member of said first pair of reflecting members towards said inner portion of said collapsible housing when said collapsible housing is collapsed.

* * * * *